US012181807B2

(12) United States Patent
Mizuno et al.

(10) Patent No.: US 12,181,807 B2
(45) Date of Patent: Dec. 31, 2024

(54) IMAGE FORMING APPARATUS AND METHOD TO DETERMINE CONTROL TEMPERATURES FOR COOLING CONTROL OF INSIDE OF THE IMAGE FORMING APPARATUS

(71) Applicant: Brother Kogyo Kabushiki Kaisha, Nagoya (JP)

(72) Inventors: Yusuke Mizuno, Nagoya (JP); Shintaro Sakaguchi, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 18/295,452

(22) Filed: Apr. 4, 2023

(65) Prior Publication Data

US 2023/0305435 A1 Sep. 28, 2023

Related U.S. Application Data

(63) Continuation of application No. 17/472,997, filed on Sep. 13, 2021, now Pat. No. 11,650,519.

(30) Foreign Application Priority Data

Sep. 23, 2020 (JP) ................................ 2020-158295
Sep. 23, 2020 (JP) ................................ 2020-158297
Sep. 23, 2020 (JP) ................................ 2020-158299

(51) Int. Cl.
*G03G 15/08* (2006.01)
*G03G 15/00* (2006.01)
*G03G 21/20* (2006.01)

(52) U.S. Cl.
CPC ..... *G03G 15/0868* (2013.01); *G03G 15/5045* (2013.01); *G03G 21/206* (2013.01)

(58) Field of Classification Search
CPC ...................... G03G 15/0868; G03G 15/5045
See application file for complete search history.

(56) References Cited

U.S. PATENT DOCUMENTS

2013/0287426 A1 10/2013 Sadamitsu
2016/0091859 A1 3/2016 Tanaka

FOREIGN PATENT DOCUMENTS

JP H09-101672 A 4/1997
JP 2001-075460 A 3/2001
(Continued)

OTHER PUBLICATIONS

Notice of Reasons for Refusal for the related Japanese Patent Application No. 2020-158299 dated Apr. 2, 2024.

*Primary Examiner* — Walter L Lindsay, Jr.
*Assistant Examiner* — Andrew V Do
(74) *Attorney, Agent, or Firm* — KENEALY VAIDYA LLP

(57) ABSTRACT

An image forming apparatus includes a main body housing, a first cartridge to store first developer, a second cartridge to store second developer, a first temperature sensor to detect an inside temperature as a temperature inside the main body housing, and a controller configured to calculate a first control temperature corresponding to the first cartridge, using the detected inside temperature and a first coefficient to be multiplied by the inside temperature, calculate a second control temperature corresponding to the second cartridge, using the detected inside temperature and a second coefficient to be multiplied by the inside temperature, the second coefficient being different from the first coefficient, and perform cooling control to cool an inside of the main body housing when at least one selected from the first control temperature and the second control temperature is higher than a particular threshold.

20 Claims, 10 Drawing Sheets

(56) References Cited

FOREIGN PATENT DOCUMENTS

| | | | | |
|---|---|---|---|---|
| JP | 2006-227558 | A | | 8/2006 |
| JP | 2007-322539 | A | | 12/2007 |
| JP | 2012-226241 | A | | 11/2012 |
| JP | 2013-228600 | A | | 11/2013 |
| JP | 2016-009134 | A | | 1/2016 |
| JP | 2016-070958 | A | | 5/2016 |
| JP | 2016-139046 | A | | 8/2016 |
| JP | 2016224374 | A | * | 12/2016 |
| JP | 2018-004785 | A | | 1/2018 |

* cited by examiner

IMAGE FORMING APPARATUS AND METHOD TO DETERMINE CONTROL TEMPERATURES FOR COOLING CONTROL OF INSIDE OF THE IMAGE FORMING APPARATUS

REFERENCE TO RELATED APPLICATIONS

This application is a continuation of U.S. patent application Ser. No. 17/472,997 that claims priority under 35 U.S.C. § 119 from Japanese Patent Applications No. 2020-158295, No. 2020-158297, and No. 2020-158299 that were filed on Sep. 23, 2020. The entire subject matter of the applications is incorporated herein by reference.

BACKGROUND ART

Technical Field

Aspects of the present disclosure are related to an image forming apparatus having a controller to perform cooling control to cool an inside of a main body housing.

Related Art

Heretofore, an image forming apparatus has been known that includes a controller configured to calculate a control temperature for triggering cooling control, based on an inside temperature (i.e., a temperature inside the image forming apparatus) obtained from an inside temperature sensor, an outside temperature (i.e., a temperature of air outside the image forming apparatus) obtained from an outside temperature sensor, and a driving state of a cartridge.

DESCRIPTION

Summary

In the meantime, if the image forming apparatus includes a plurality of cartridges, each individual cartridge would have a different driving state and a different temperature environment inside the image forming apparatus from those of the other cartridges. Therefore, according to how to calculate the control temperature(s), the image forming apparatus might be unable to appropriately cool the plurality of cartridges.

Aspects of the present disclosure are advantageous to provide one or more improved techniques for an image forming apparatus to perform appropriate cooling control for cooling a plurality of cartridges.

According to aspects of the present disclosure, an image forming apparatus is provided, which includes a main body housing, a first cartridge configured to store first developer, a second cartridge configured to store second developer, a first temperature sensor configured to detect an inside temperature as a temperature inside the main body housing, and a controller. The controller is configured to calculate a first control temperature corresponding to the first cartridge, using the inside temperature detected by the first temperature sensor, and a first coefficient to be multiplied by the inside temperature, calculate a second control temperature corresponding to the second cartridge, using the inside temperature detected by the first temperature sensor, and a second coefficient to be multiplied by the inside temperature, the second coefficient being different from the first coefficient, and perform cooling control to cool an inside of the main body housing when at least one selected from the first control temperature and the second control temperature is higher than a particular threshold.

According to aspects of the present disclosure, further provided is a method implementable on an image forming apparatus including a main body housing, a first cartridge, and a second cartridge. The method includes calculating a first control temperature corresponding to the first cartridge, using an inside temperature of the main body housing and a first coefficient to be multiplied by the inside temperature, calculating a second control temperature corresponding to the second cartridge, using the inside temperature of the main body housing, and a second coefficient to be multiplied by the inside temperature, the second coefficient being different from the first coefficient, and performing cooling control to cool an inside of the main body housing when at least one selected from the first control temperature and the second control temperature is higher than a particular threshold.

According to aspects of the present disclosure, further provided is an image forming apparatus that includes a housing, a first cartridge, a second cartridge, a temperature sensor, and a controller. The controller is configured to retrieve, from the temperature sensor, an inside temperature $T_{in}$ which is a temperature of air inside the housing, calculate a first differential temperature $\Delta T_{B\text{-}first}$ using the inside temperature $T_{in}$ and a first thermal resistance $R_{in\text{-}B\text{-}first}$, the first differential temperature $\Delta T_{B\text{-}first}$ being a change in temperature of the first cartridge, the first thermal resistance $R_{in\text{-}B\text{-}first}$ being a thermal resistance between the air inside the housing and the first cartridge, and calculate a second differential temperature $\Delta T_{B\text{-}second}$ using the inside temperature $T_{in}$ and a second thermal resistance $R_{in\text{-}B\text{-}second}$, the second differential temperature $\Delta T_{B\text{-}second}$ being a change in temperature of the second cartridge, the second thermal resistance $R_{in\text{-}B\text{-}second}$ being a thermal resistance between the air inside the housing and the second cartridge and being different from the first thermal resistance $R_{in\text{-}B\text{-}first}$.

BRIEF DESCRIPTION OF THE ACCOMPANYING DRAWINGS

Figure 3:
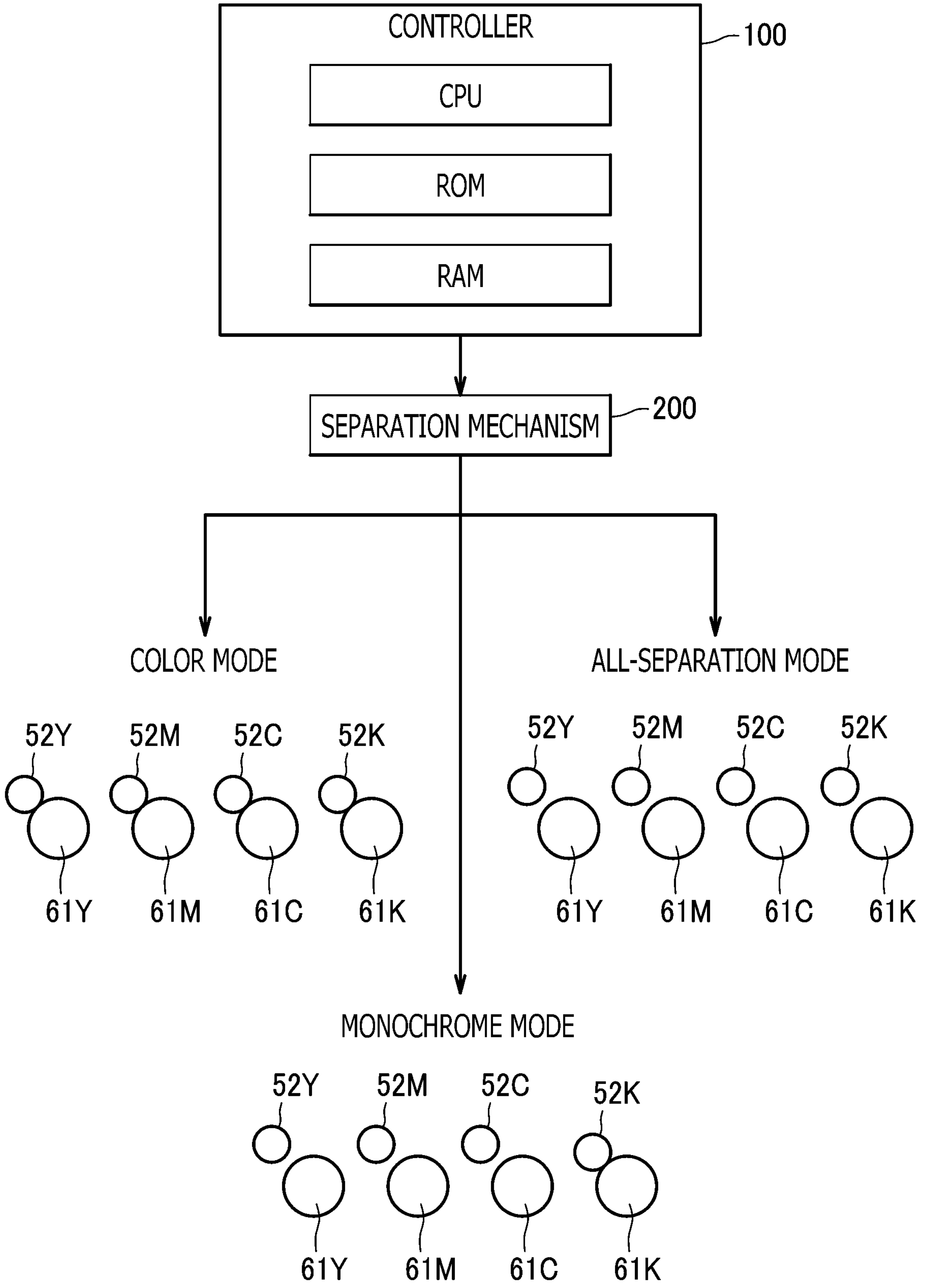

FIG. 3 shows a color mode in which all developing rollers are in contact with corresponding photoconductive drums, a monochrome mode in which only one developing roller for black is in contact with a corresponding photoconductive drum, and an all-separation mode in which all the developing rollers are separated from the corresponding photoconductive drums, in the illustrative embodiment according to one or more aspects of the present disclosure.

Figure 4:
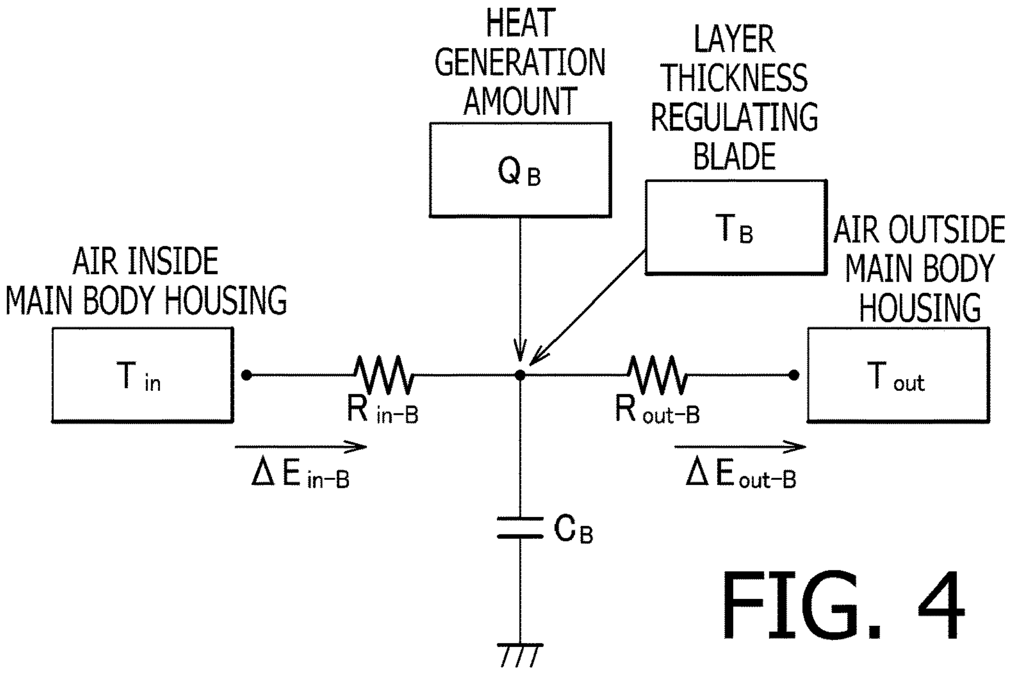

FIG. 4 shows a thermal circuit illustrating heat transfer to and from a regulating blade, in the illustrative embodiment according to one or more aspects of the present disclosure.

Figure 5:
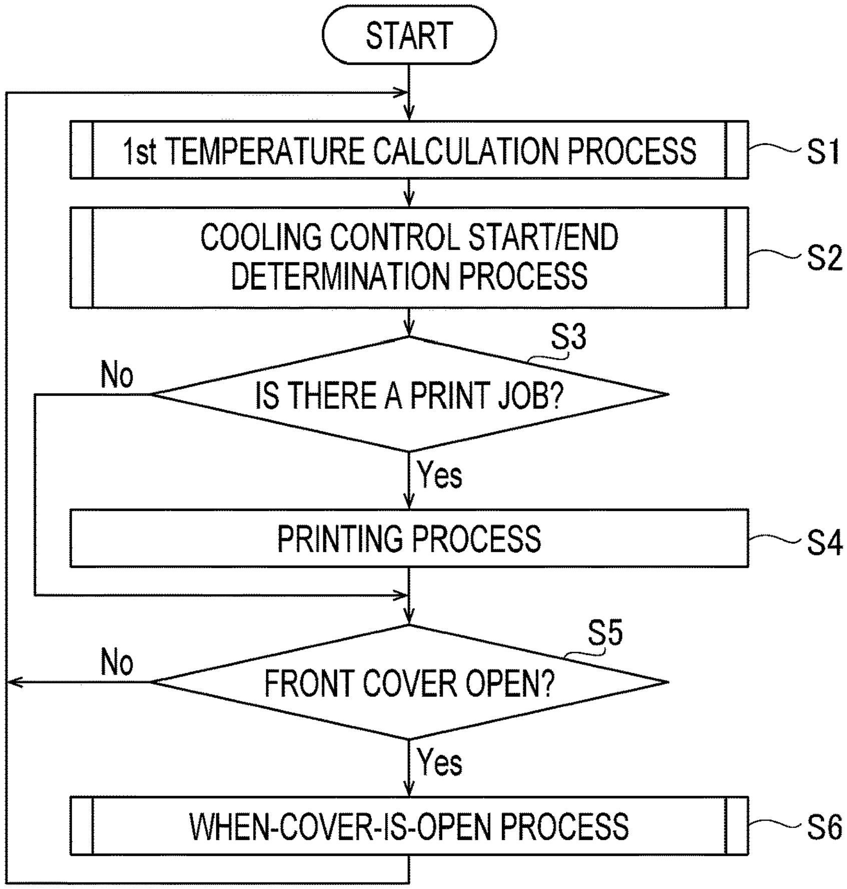

FIG. 5 is a flowchart showing a sequence of processes by a controller of the color printer, in the illustrative embodiment according to one or more aspects of the present disclosure.

Figure 6:
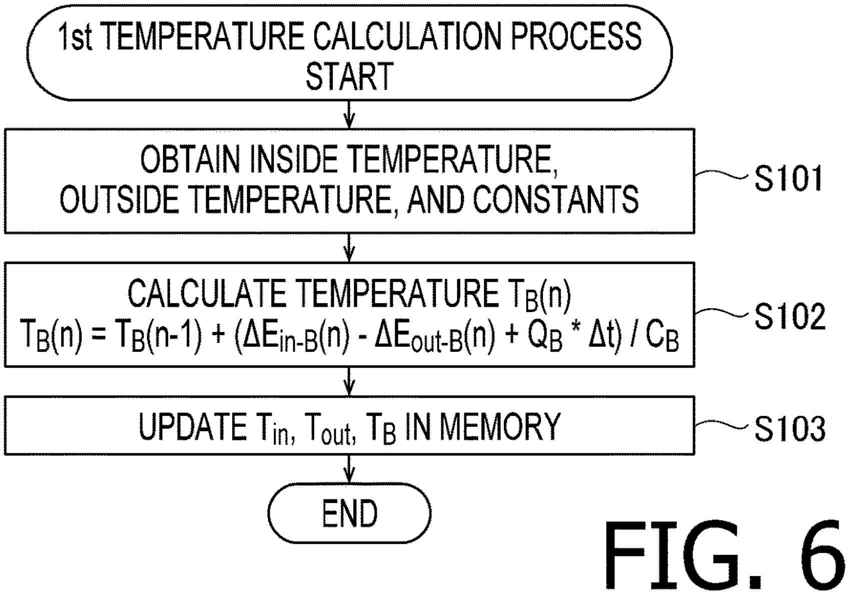

FIG. 6 is a flowchart showing a procedure of a first temperature calculation process in the illustrative embodiment according to one or more aspects of the present disclosure.

Figure 7:
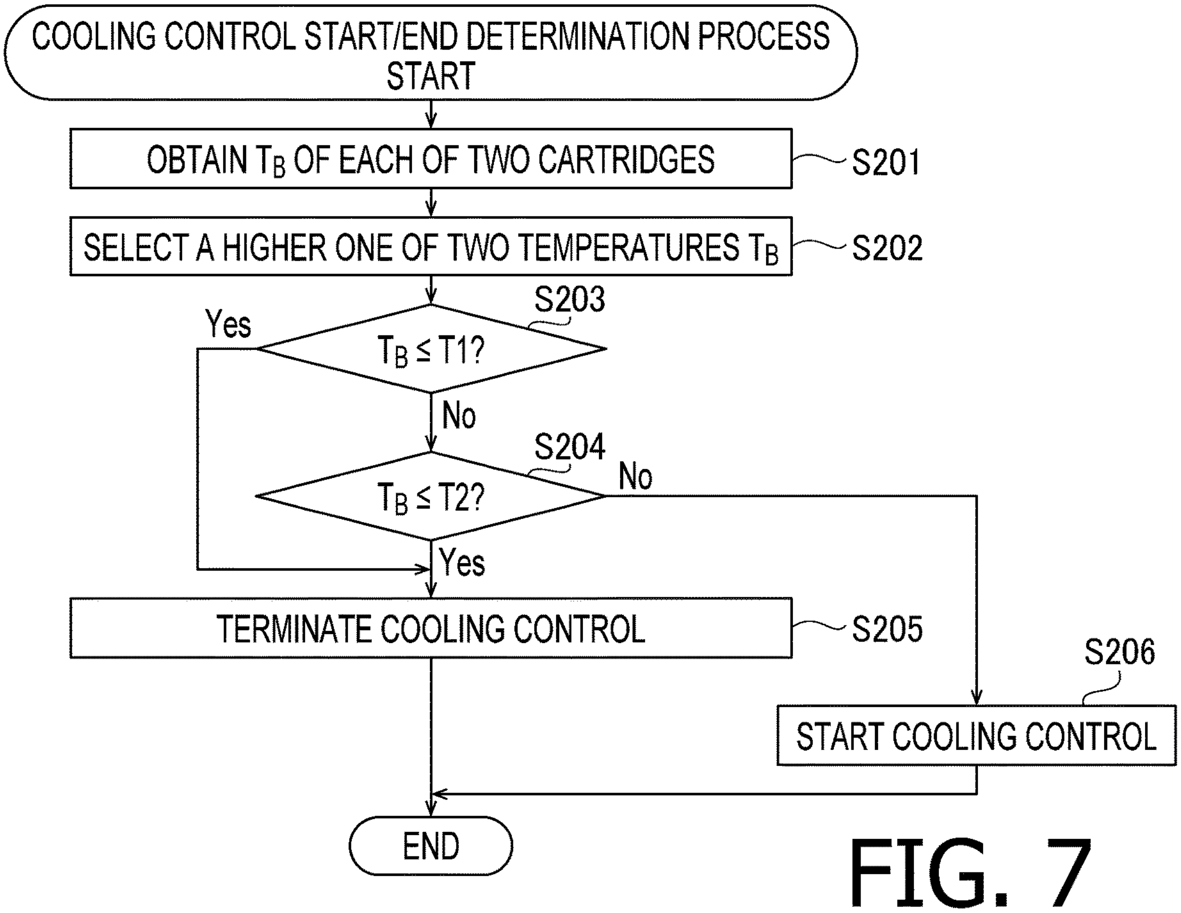

FIG. 7 is a flowchart showing a procedure of a cooling control start/end determination process in the illustrative embodiment according to one or more aspects of the present disclosure.

Figure 8A:
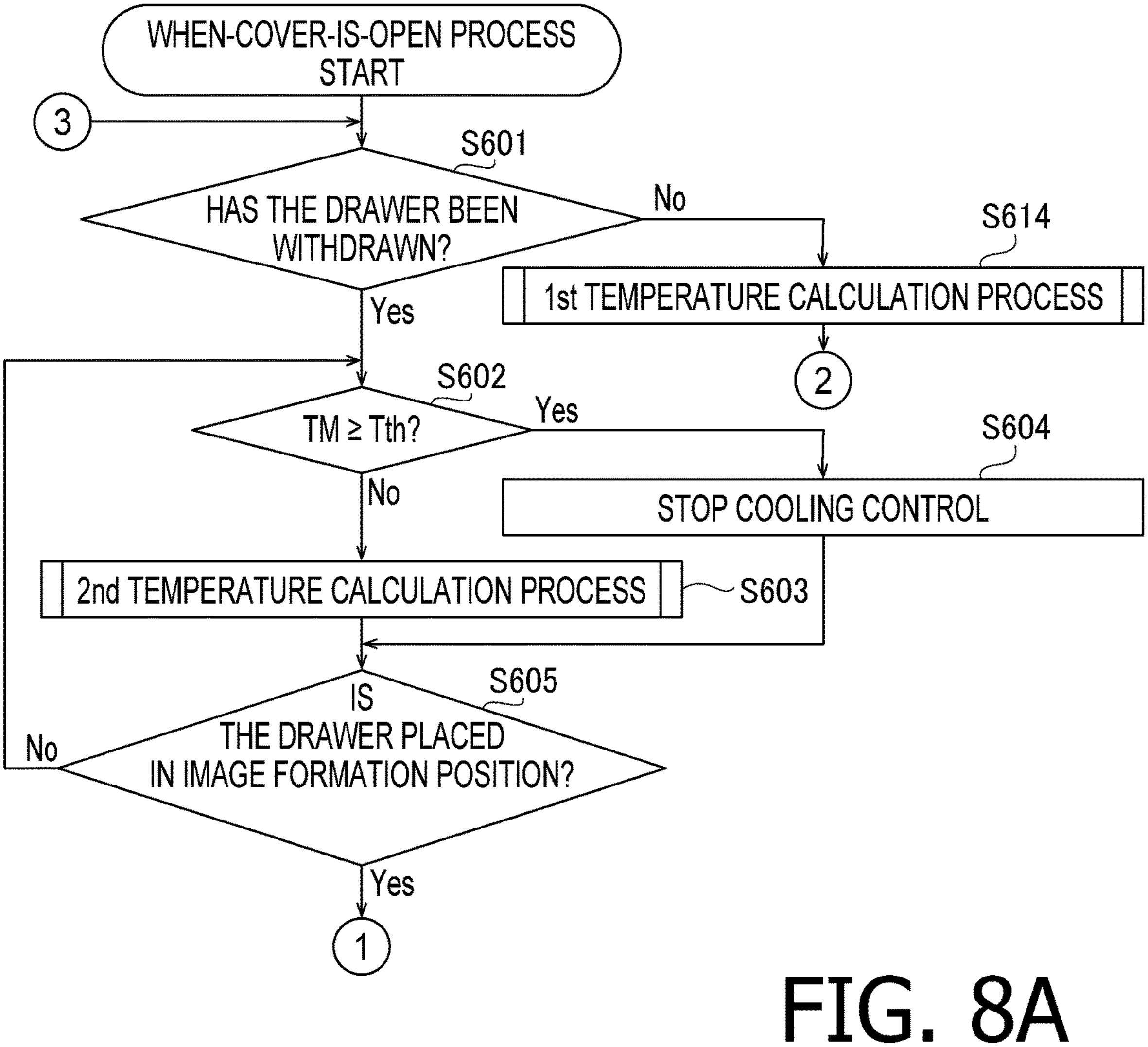
Figure 8B:
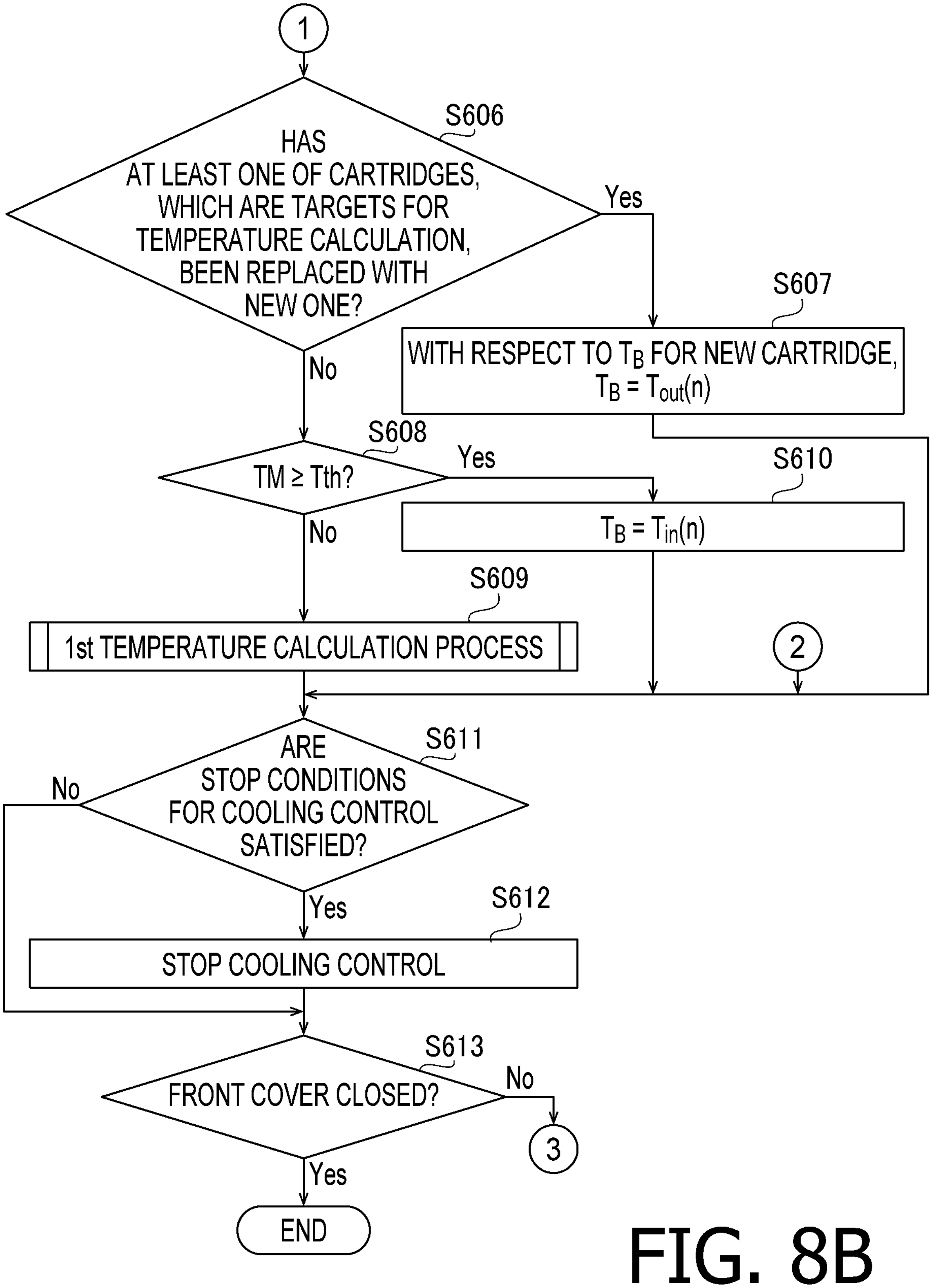

FIGS. 8A and 8B are flowcharts showing a procedure of a when-cover-is-open process in the illustrative embodiment according to one or more aspects of the present disclosure.

Figure 9:
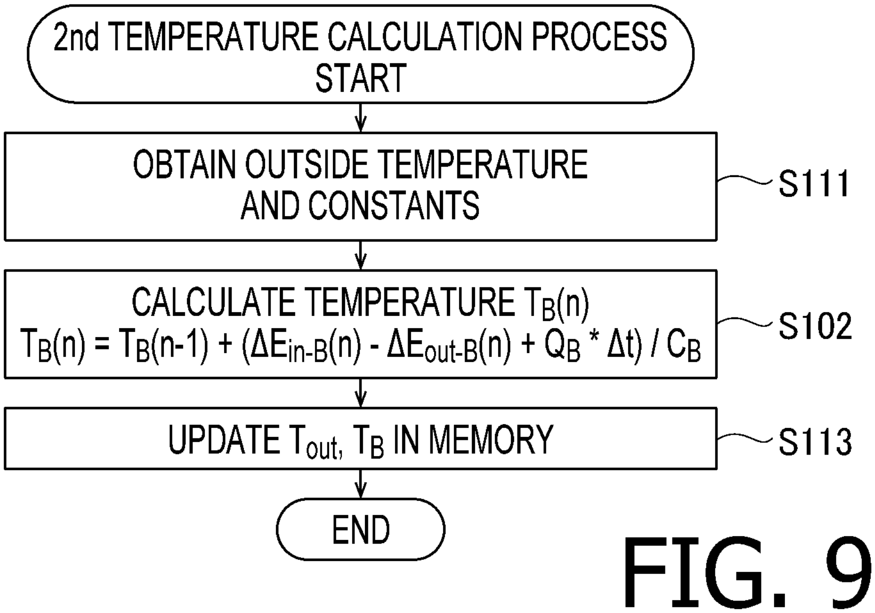

FIG. 9 is a flowchart showing a procedure of a second temperature calculation process in the illustrative embodiment according to one or more aspects of the present disclosure.

Figure 10:
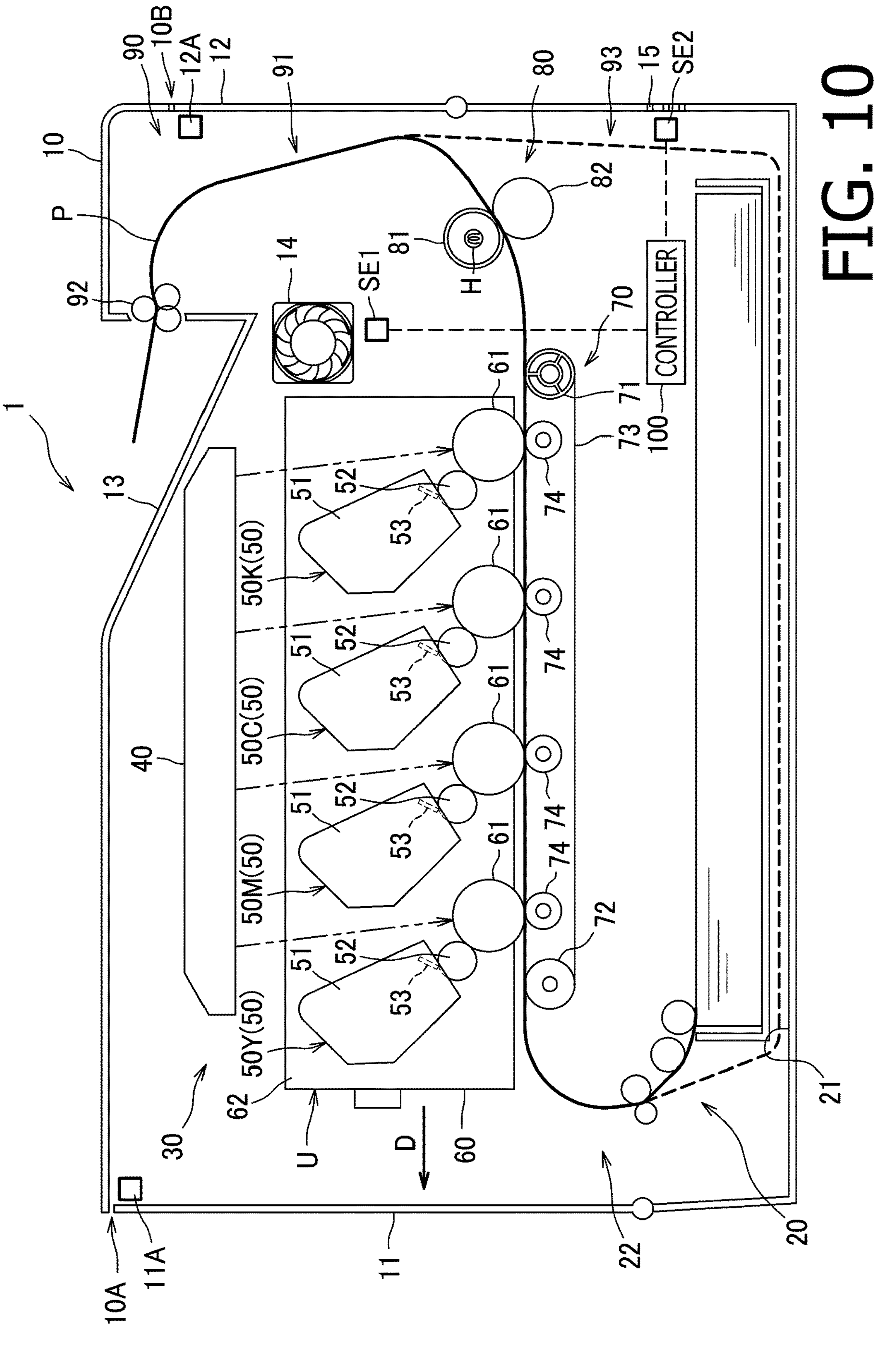

FIG. 10 is a cross-sectional view showing a configuration of a color printer of which the main body housing includes the first temperature sensor, in a modification according to one or more aspects of the present disclosure.

Figure 11:
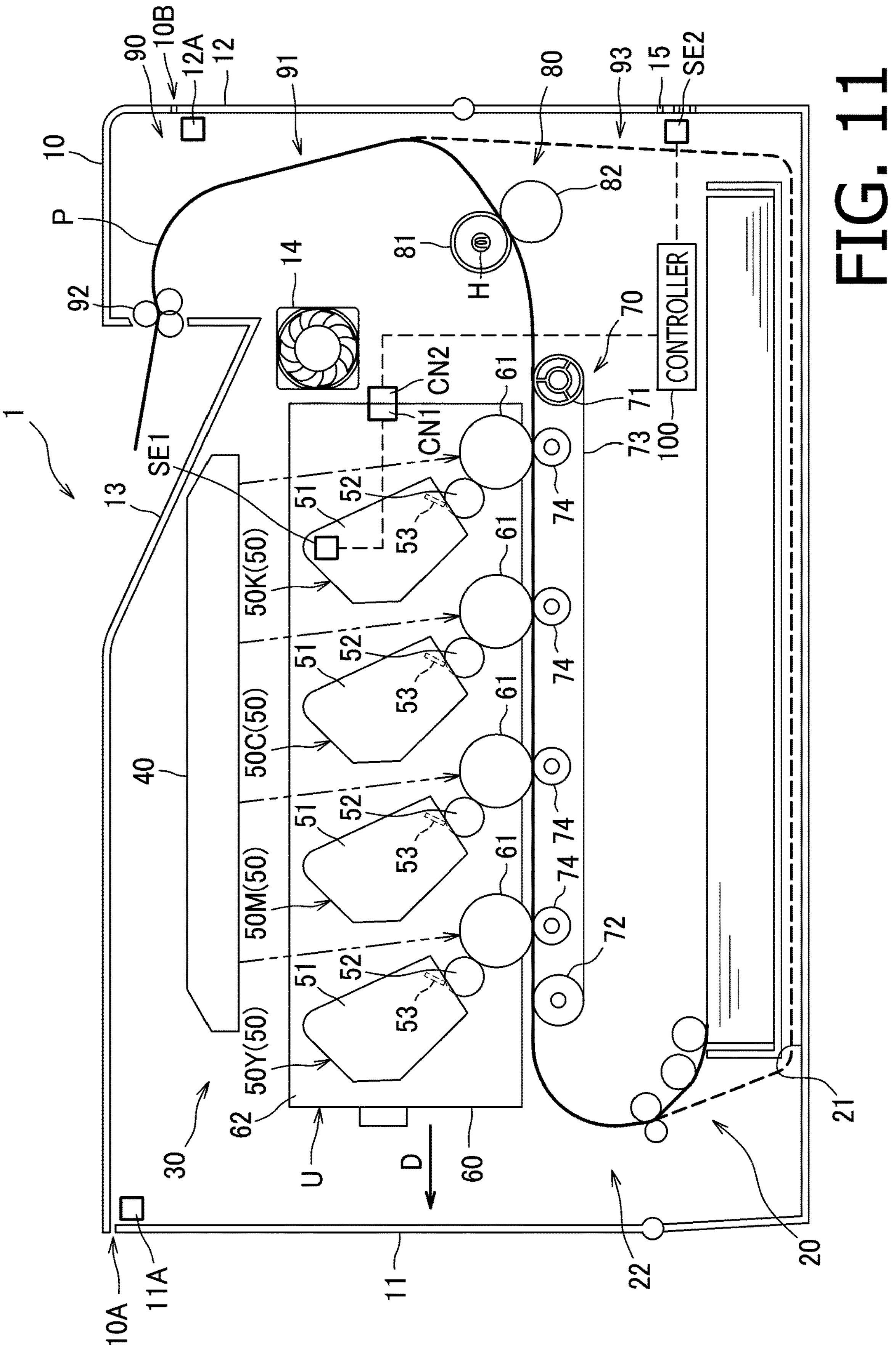

FIG. 11 is a cross-sectional view showing a configuration of a color printer of which a cartridge includes the first temperature sensor, in another modification according to one or more aspects of the present disclosure.

DETAILED DESCRIPTION (General Overview)

According to aspects of the present disclosure, an image forming apparatus is provided, which includes a main body housing, a first cartridge configured to store first developer, a second cartridge configured to store second developer, a first temperature sensor configured to detect an inside temperature as a temperature inside the main body housing, and a controller. The controller is configured to calculate a first control temperature corresponding to the first cartridge, using the inside temperature detected by the first temperature sensor, and a first coefficient to be multiplied by the inside temperature, calculate a second control temperature corresponding to the second cartridge, using the inside temperature detected by the first temperature sensor, and a second coefficient to be multiplied by the inside temperature, the second coefficient being different from the first coefficient, and perform cooling control to cool an inside of the main body housing when at least one selected from the first control temperature and the second control temperature is higher than a particular threshold.

The controller may be further configured to calculate the first control temperature and the second control temperature at particular time intervals.

The controller may be further configured to calculate the first control temperature at a present time, using the first control temperature calculated at a previous time, and calculate the second control temperature at the present time, using the second control temperature calculated at the previous time.

The image forming apparatus may further include a second temperature sensor configured to detect an outside temperature as a temperature outside the main body housing. In this case, the controller may be further configured to calculate the first control temperature using the outside temperature detected by the second temperature sensor and a third coefficient to be multiplied by the outside temperature, as well as the detected inside temperature and the first coefficient, and calculate the second control temperature using the outside temperature detected by the second temperature sensor and a fourth coefficient to be multiplied by the outside temperature, as well as the detected inside temperature and the second coefficient.

The controller may be further configured to calculate the first control temperature using an amount of operation of the first cartridge, as well as the detected inside temperature and the first coefficient, and calculate the second control temperature using an amount of operation of the second cartridge, as well as the detected inside temperature and the second coefficient.

The first cartridge may be configured to store black developer as the first developer. Further, the second cartridge may be configured to store colored developer as the second developer. In this case, the controller may be further configured to, when forming a monochrome image, operate the second cartridge without operating the first cartridge, and when forming a color image, operate the first cartridge and the second cartridge.

The image forming apparatus may further include a fan configured to cool the inside of the main body housing. In this case, the controller may be further configured to set an air volume of air from the fan larger than when the cooling control is not performed.

The controller may be further configured to set a count of pages to be printed per unit time less than when the cooling control is not performed.

The image forming apparatus may further include a second temperature sensor configured to detect an outside temperature as a temperature of air outside the main body housing. In this case, the controller may be further configured to, when determining that the first cartridge has been replaced with a new cartridge, set the first control temperature based on the outside temperature detected by the second temperature sensor, and when determining that the second cartridge has been replaced with a new cartridge, set the second control temperature based on the outside temperature detected by the second temperature sensor.

The image forming apparatus may further include a fuser configured to fix a developer image onto a sheet. In this case, the first cartridge may be positioned closer to the fuser than the second cartridge is. Further, a distance between the first temperature sensor and the first cartridge may be shorter than a distance between the first temperature sensor and the second cartridge.

According to aspects of the present disclosure, further provided is a method implementable on an image forming apparatus including a main body housing, a first cartridge, and a second cartridge. The method includes calculating a first control temperature corresponding to the first cartridge, using an inside temperature of the main body housing and a first coefficient to be multiplied by the inside temperature, calculating a second control temperature corresponding to the second cartridge, using the inside temperature of the main body housing, and a second coefficient to be multiplied by the inside temperature, the second coefficient being different from the first coefficient, and performing cooling control to cool an inside of the main body housing when at least one selected from the first control temperature and the second control temperature is higher than a particular threshold.

According to aspects of the present disclosure, further provided is an image forming apparatus that includes a housing, a first cartridge, a second cartridge, a temperature sensor, and a controller. The controller is configured to retrieve, from the temperature sensor, an inside temperature $T_{in}$ which is a temperature of air inside the housing, calculate a first differential temperature $\Delta T_{B\text{-}first}$ using the inside temperature $T_{in}$ and a first thermal resistance $R_{in\text{-}B\text{-}first}$, the first differential temperature $\Delta T_{B\text{-}first}$ being a change in temperature of the first cartridge, the first thermal resistance $R_{in\text{-}B\text{-}first}$ being a thermal resistance between the air inside the housing and the first cartridge, and calculate a second differential temperature $\Delta T_{B\text{-}second}$ using the inside temperature $T_{in}$ and a second thermal resistance $R_{in\text{-}B\text{-}second}$, the second differential temperature $\Delta T_{B\text{-}second}$ being a change in temperature of the second cartridge, the second thermal resistance $R_{in\text{-}B\text{-}second}$ being a thermal resistance between the air inside the housing and the second cartridge and being different from the first thermal resistance $R_{in\text{-}B\text{-}first}$.

The controller may be further configured to calculate a first control temperature corresponding to the first cartridge in accordance with a first equation, calculate a second control temperature corresponding to the second cartridge in accordance with a second equation, and perform cooling control to cool an inside of the housing when at least one selected from the first control temperature and the second control temperature is higher than a particular threshold. The first equation may be expressed as $T_{B\text{-}first}(n)=T_{B\text{-}first}(n-1)+\Delta T_{B\text{-}first}$, where $T_{B\text{-}first}(n)$ represents the first control temperature at a present time, $T_{B\text{-}first}(n-1)$ represents the first control temperature at a previous time, and $\Delta T_{B\text{-}first}$ represents the first differential temperature. The second equation may be expressed as $T_{B\text{-}second}(n)=T_{B\text{-}second}(n-1)+\Delta T_{B\text{-}second}$, where $T_{B\text{-}second}(n)$ represents the second control temperature at a present time, $T_{B\text{-}second}(n-1)$ represents the second control temperature at a previous time, and $\Delta T_{B\text{-}second}$ represents the second differential temperature.

According to aspects of the present disclosure, further provided is an image forming apparatus that includes a main body housing, a drawer configured to hold a cartridge storing developer and to be withdrawn out of an image formation position in the main body housing, a first temperature sensor disposed at the drawer, and a controller. The controller is configured to perform cooling control to cool an inside of the main body housing, based on control temperature. In a case where the drawer is placed in the image formation position after the drawer is withdrawn out of the image formation position, when an elapsed time since the drawer was withdrawn out of the image formation position is shorter than a particular time, the controller calculates the control temperature based on a temperature detected by the first temperature sensor and a previous control temperature. In this case, when the elapsed time is equal to or longer than the particular time, the controller sets the control temperature based on the temperature detected by the first temperature sensor without using the previous control temperature.

The controller may be further configured to, when the drawer is out of the image formation position, calculate the control temperature based on a temperature detected by the first temperature sensor immediately before the drawer is withdrawn out of the image formation position, and the previous control temperature.

The controller may be further configured to calculate the control temperature based on the temperature detected by the first temperature sensor, the previous control temperature, and an amount of operation of the cartridge.

The drawer may include a first contact conductive to the first temperature sensor. Further, the main body housing may include a second contact conductive to the controller. In this case, when the drawer is out of the image formation position, the first contact may be disconnected from the second contact. Further, when the drawer is placed in the image formation position, the first contact may be connected with the second contact.

The image forming apparatus may further include a fan configured to cool the inside of the main body housing. In this case, the controller may be further configured to set an air volume of air from the fan larger than when the cooling control is not performed.

The controller may be further configured to set a count of pages to be printed per unit time less than when the cooling control is not performed.

The image forming apparatus may further include a second temperature sensor configured to detect an outside temperature as a temperature of air outside the main body housing. In this case, the controller may be further configured to calculate the control temperature based on the temperature detected by the first temperature sensor, the previous control temperature, the amount of operation of the cartridge, and the outside temperature detected by the second temperature sensor.

The controller may be further configured to, when the drawer is placed in the image formation position, and it is determined that the cartridge is replaced with a new cartridge, regardless of the elapsed time, set the control temperature based on the outside temperature detected by the second temperature sensor, without using the previous control temperature.

The cartridge may include a developing roller, and a container configured to store the developer.

The drawer may include a photoconductive body.

The first temperature sensor may be disposed upstream of the cartridge in a pull-out direction in which the drawer is withdrawn.

The image forming apparatus may further include a fuser configured to fix a developer image onto a sheet. In this case, the first temperature sensor may be disposed between the cartridge and the fuser in the pull-out direction.

According to aspects of the present disclosure, further provided is an image forming apparatus that includes a main body housing, a cartridge configured to be removably attached to the main body housing and to store developer, a first temperature sensor disposed at the cartridge, and a controller. The controller is configured to perform cooling control to cool an inside of the main body housing, based on control temperature. In a case where the cartridge is attached to the main body housing after the cartridge is removed from the main body housing, when an elapsed time since the cartridge was removed from the main body housing is shorter than a predetermined time, the controller calculates the control temperature based on a temperature detected by the first temperature sensor and a previous control temperature. In this case, when the elapsed time is equal to or longer than the predetermined time, the controller sets the control temperature based on the temperature detected by the first temperature sensor without using the previous control temperature.

According to aspects of the present disclosure, further provided is an image forming apparatus that includes a main body housing, a drawer configured to hold a cartridge storing developer and to be withdrawn out of an image formation position in the main body housing, a first temperature sensor disposed at the drawer, and a controller. The controller is configured to start and stop cooling control to cool an inside of the main body housing based on control temperature. The control temperature is determined based on a temperature detected by the first temperature sensor. The controller continues the cooling control when the drawer is withdrawn out of the image formation position during the cooling control. The controller stops the cooling control when an elapsed time since the drawer was withdrawn out of the image formation position is equal to or longer than a particular time, in a state where the drawer remains withdrawn out of the image formation position.

The controller may be further configured to, when the drawer is placed in the image formation position, if the elapsed time is shorter than the particular time, stop the cooling control based on the control temperature.

The image forming apparatus may further include a fan configured to cool the inside of the main body housing. In this case, the controller may be further configured to set an air volume of air from the fan larger than when the cooling control is not performed.

The controller may be further configured to calculate the control temperature based on the temperature detected by the first temperature sensor and an amount of operation of the cartridge.

The drawer may include a first contact conductive to the first temperature sensor. Further, the main body housing may include a second contact conductive to the controller. In this case, when the drawer is out of the image formation position, the first contact may be disconnected from the second contact. Further, when the drawer is placed in the image formation position, the first contact may be connected with the second contact.

The image forming apparatus may further include a second temperature sensor configured to detect an outside temperature as a temperature of air outside the main body housing. In this case, the controller may be further configured to calculate the control temperature based on the temperature detected by the first temperature sensor, the amount of operation of the cartridge, and the outside temperature detected by the second temperature sensor.

The cartridge may include a developing roller, and a container configured to store the developer.

The drawer may include a photoconductive body.

The first temperature sensor may be disposed upstream of the cartridge in a pull-out direction in which the drawer is withdrawn.

The image forming apparatus may further include a fuser configured to fix a developer image onto a sheet. In this case, the first temperature sensor may be disposed between the cartridge and the fuser in the pull-out direction.

According to aspects of the present disclosure, further provided is an image forming apparatus that includes a main body housing, a cartridge configured to be removably attached to the main body housing and to store developer, a first temperature sensor disposed at the cartridge, and a controller. The controller is configured to perform start and stop control to cool an inside of the main body housing, based on control temperature. The control temperature is determined based on a temperature detected by the first temperature sensor. The controller continues the cooling control when the cartridge is removed from the main body housing. The controller stops the cooling control when an elapsed time since the cartridge was removed from the main body housing is equal to or longer than a predetermined time, in a state where the cartridge remains removed from the main body housing.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

(Illustrative Embodiment)

Figure 1:
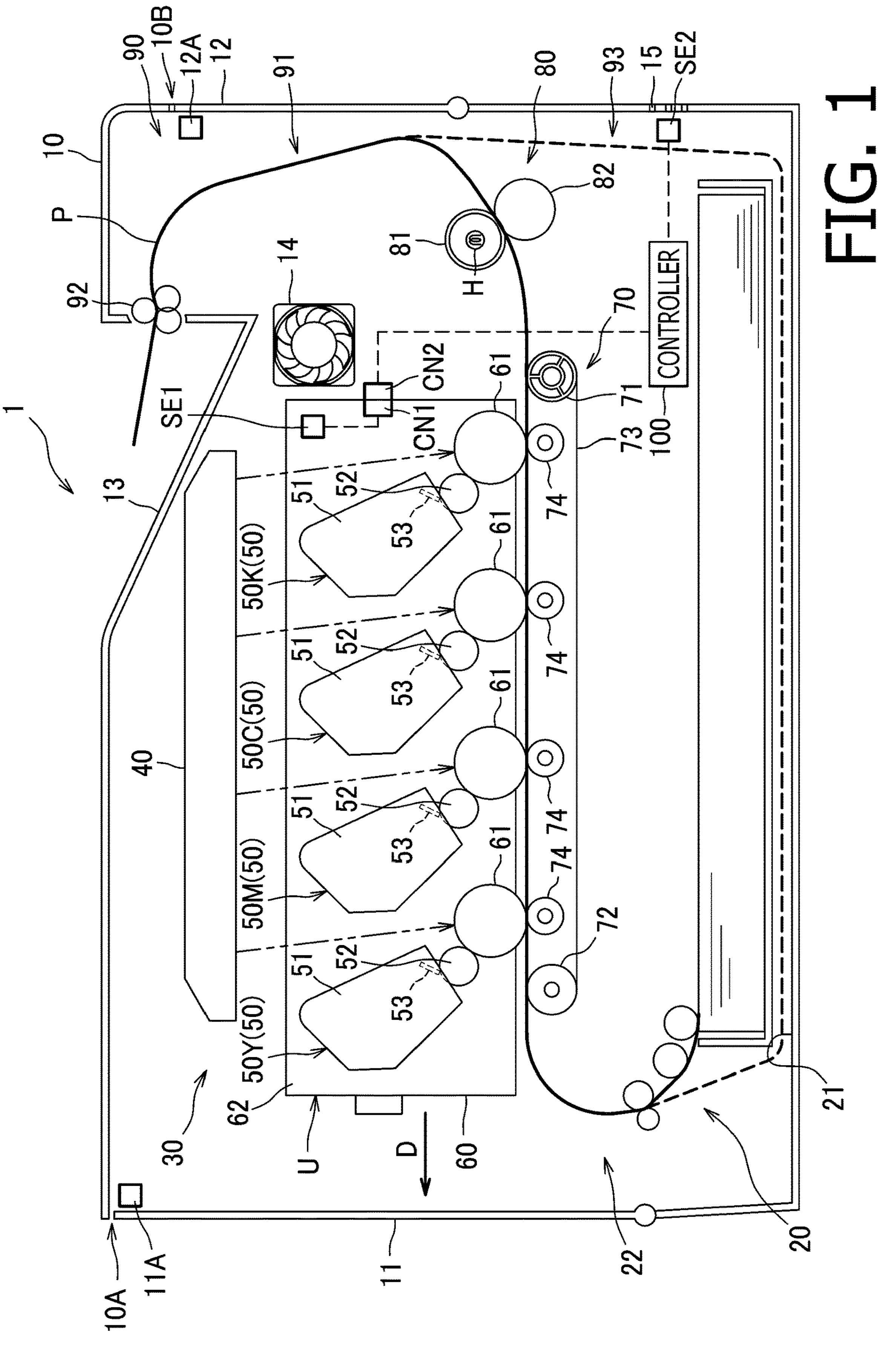
FIG. 1 is a cross-sectional view showing a configuration of a color printer of which a drawer includes a first temperature sensor, in an illustrative embodiment according to one or more aspects of the present disclosure.

Hereinafter, an illustrative embodiment according to aspects of the present disclosure will be described with reference to the accompanying drawings. As shown in FIG. 1, a color printer 1 includes a main body housing 10, a sheet feeder 20 configured to feed a sheet P, an image forming engine 30 configured to form an image on the fed sheet P, a sheet conveyor 90 configured to discharge the sheet P with the image formed thereon, and a controller 100.

The main body housing 10 has a first opening 10A, a front cover 11, a second opening 10B, and a rear cover 12. The first opening 10A is an opening through which a below-mentioned unit U is inserted and drawn out. The front cover 11 is rotatable between an open position to open the first opening 10A and a closed position to close the first opening 10A.

The second opening 10B is an opening through which the sheet P is removed. The rear cover 12 is rotatable between an open position to open the second opening 10B and a closed position to close the second opening 10B.

The sheet feeder 20 includes a feed tray 21 that accommodates sheets P, and a sheet feeding mechanism 22 configured to feed the sheets P from the feed tray 21 to the image forming engine 30.

The image forming engine 30 includes a scanner unit 40, a unit U, a transfer unit 70, and a fuser 80.

The scanner unit 40 includes a laser emitter, a polygon mirror, a lens, and a reflective mirror, which are not shown in any drawings. The scanner unit 40 is configured to emit a laser beam onto a surface of each photoconductive drum 61.

The unit U is configured to be pulled out from the main body housing 10 through the first opening 10A. The unit U includes four cartridges 50 and a drawer 60.

Each cartridge 50 is attachable to and removable from the drawer 60. Each cartridge 50 includes a toner container 51, a developing roller 52, and a regulating blade 53. The toner container 51 is configured to store toner. The regulating blade 53 is configured to contact the developing roller 52 to regulate the layer thickness of toner on the developing roller 52. The toner containers 51 of the four cartridges 50 store therein toner of different colors, i.e., yellow, magenta, cyan, and black, respectively.

Hereinafter, the four cartridges 50 containing the toner of the different colors (i.e., yellow, magenta, cyan, and black) may be represented by different reference characters 50Y, 50M, 50C, and 50K, respectively. As shown in FIG. 1, the four cartridges 50Y, 50M, 50C, and 50K are arranged in this order from the upstream in a sheet conveyance direction. It is noted that, in the present disclosure, to identify a specific element corresponding to a specific one of the toner colors from among, e.g., the photoconductive drums 61 or the developing rollers 52, the specific element will be represented by the reference numeral with a corresponding one of the characters Y, M, C, and K added.

When the unit U is placed in a position for image formation in the main body housing 10, the cartridge 50Y is closest to the first opening 10A, and the cartridge 50K is farthest from the first opening 10A. In the following description, the cartridge 50K may be referred to as the "first cartridge 50K," and the cartridge 50Y may be referred to as the "second cartridge 50Y." The first cartridge 50K is closer to the fuser 80 than the second cartridge 50Y is. Further, it is noted that hereinafter, the position for image formation may be referred to as the "image formation position."

The drawer 60 is configured to be pulled out in a direction perpendicular to the vertical direction from the image formation position in the main body housing 10. The image formation position is a position of the drawer 60 when image formation is performed. The drawer 60 includes the four photoconductive drums 61, four chargers (not shown), a frame 62 that holds the four cartridges 50 detachably attached thereto, a first temperature sensor SE1, and a first contact CN1. The four photoconductive drums 61 and the four chargers are disposed in the frame 62, corresponding to the four developing rollers 52.

The frame 62 is supported by the main body housing 10 to be movable in the direction perpendicular to the vertical direction. The first temperature sensor SE1 is, for instance, a thermistor. The first temperature sensor SE1 is configured to detect an inside temperature that is a temperature inside the main body housing 10. The first contact CN1 is conductive to the first temperature sensor SE1 via wiring.

The first temperature sensor SE1 and the first contact CN1 are disposed upstream of the first cartridge 50K as the most upstream one of the cartridges 50 in a pull-out direction D for the drawer 60. In other words, the first temperature sensor SE1 and the first contact CN1 are positioned between the first cartridge 50K and the fuser 80 in the pull-out direction D for the drawer 60. In the pull-out direction D for the drawer 60, a distance between the first temperature sensor SE1 and the first cartridge 50K is shorter than a distance between the first temperature sensor SE1 and the second cartridge 50Y.

The main body housing 10 has a second contact CN2 that is conductively connected with the controller 100 via wiring. The first contact CN1 is connected with the second contact CN2 in a state where the drawer 60 is in the image formation position in the main body housing 10. Specifically, the first contact CN1 is connected to the second contact CN2 when the drawer 60 is placed in the image formation position.

Figure 2:
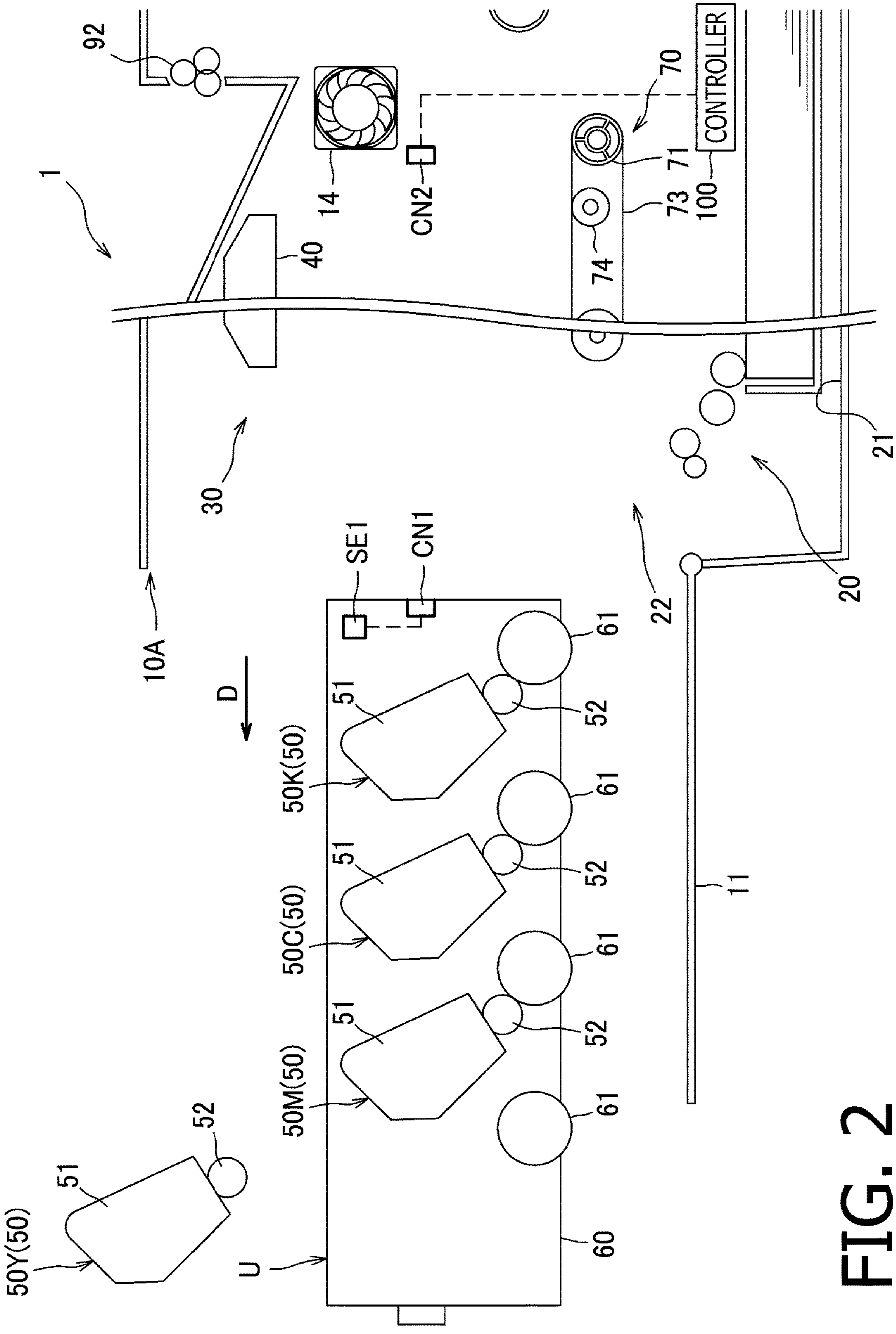
FIG. 2 shows a state in which the drawer is pulled out from a main body housing of the printer, in the illustrative embodiment according to one or more aspects of the present disclosure.

As shown in FIG. 2, the first contact CN1 is apart from the second contact CN2 in a state where the drawer 60 is pulled out from the main body housing 10. Specifically, when the drawer 60 is out of the image formation position, the first contact CN1 is separated from the second contact CN2.

Referring back to FIG. 1, the transfer unit 70 includes a driving roller 71, a driven roller 72, a conveyance belt 73, and four conveyance rollers 74. The transfer belt 73 is an endless belt. The driving roller 71 and the driven roller 72 are configured to rotate the conveyance belt 73. Each of the four conveyance rollers 74 is disposed to face a corresponding one of the photoconductive drums 61 across the conveyance belt 73 and pinch the conveyance belt 73 with the corresponding photoconductive drum 61.

The fuser 80 is configured to fix a toner image onto a sheet P. The fuser 80 includes a heating roller 81 and a pressure roller 82. The heating roller 81 is heated by a heater H. The pressure roller 82 is pressed against the heating roller 81.

When the drawer 60 is in the image formation position in the main body housing 10, the color printer 1 is allowed to perform image formation. When the drawer 60 is in the image formation position, the photoconductive drums 61 and the transfer unit 70 are in contact with each other, and the scanner unit 40 is allowed to expose a particular position of each photoconductive drum 61. In the image forming engine 30, first, a surface of each photoconductive drum 61 is uniformly charged by the corresponding charger and then exposed by the scanner unit 40. Thereby, an electrostatic latent image based on image data is formed on each photoconductive drum 61. Thereafter, the toner in the corresponding toner container 51 is supplied, via the corresponding developing roller 52. to the electrostatic latent image on each photoconductive drum 61. Thus, a toner image is formed on each photoconductive drum 61.

Next, the toner image formed on each photoconductive drum 61 is transferred onto the sheet P as the sheet P fed on the conveyance belt 73 passes between each photoconductive drum 61 and the corresponding transfer roller 74. Then, as the sheet P passes between the heating roller 81 and the pressure roller 82, the toner image transferred on the sheet P is thermally fixed.

The sheet conveyor 90 serves as a discharge mechanism to discharge the sheet P fed out from the image forming engine 30 onto the discharge tray 13 of the main body housing 10. The sheet conveyor 90 also serves as a re-conveyance mechanism to invert the surfaces of the sheet P with an image on one side thereof and re-convey the inverted sheet P to the image forming engine 30. Specifically, the sheet conveyor 90 has a conveyance path 91, a discharge roller 92, and a re-conveyance path 93.

The conveyance path 91 is configured to guide the sheet P from the fuser 80 toward the discharge tray 13.

The discharge roller 92 is configured to rotate both forward and backward. When rotating forward, the discharge roller 92 discharges the sheet P fed out from the image forming engine 30 toward the discharge tray 13. When rotating backward, the discharge roller 92 conveys the sheet P in such a manner as to pull the sheet P back into the main body housing 10.

The re-conveyance path 93 is configured to guide the sheet P with an image formed on one side thereof by the image forming engine 30, back to the image forming engine 30 through under the sheet feeder 20.

In the sheet conveyor 90, after completion of image formation, the sheet P fed out from the image forming engine 30 is conveyed along the conveyance path 91, and is discharged onto the discharge tray 13 outside the main body housing 10 by the discharge roller 92 rotating forward. Further, when another image needs to be formed on the other side of the sheet P with an image formed on one side thereof, the discharge roller 92 is rotated backward before the whole sheet P is completely discharged out of the main body housing 10. Thereby, the sheet P is pulled back into the main body housing 10 again and is conveyed from the conveyance path 91 to the re-conveyance path 93. Thereafter, the sheet P is conveyed along the re-conveyance path 93 and is again conveyed to the image forming engine 30 by the sheet feeder 20.

The main body housing 10 has a fan 14, an intake port 15, and a second temperature sensor SE2.

The fan 14 is for cooling the inside of the main body housing 10. Specifically, the fan 14 is configured to suck out air inside the main body housing 10 and exhaust the air outside the main body housing 10. The fan 14 is disposed above the fuser 80. The fan 14 is located between the fuser 80 and the drawer 60 in the pull-out direction D for the drawer 60.

The intake port 15 is an opening for introducing outside air into the main body housing 10. The intake port 15 is disposed on an opposite side of the drawer 60 across the fuser 80. The intake port 15 is located below the fuser 80. Namely, the intake port 15 is disposed in such a position that the intake port 15 is not easily affected by the heat generated by the fuser 80 and the cartridges 50.

For instance, the second temperature sensor SE2 is a thermistor. The second temperature sensor SE2 is disposed to face an inside of the intake port 15. The second temperature sensor SE2 is configured to detect a temperature of the air introduced via the intake port 15, thereby obtaining an outside temperature that is a temperature of air outside the main body housing 10. The second temperature sensor SE2 is connected with the controller 100 via wiring.

The color printer 1 further includes a front cover opening/closing sensor 11A and a rear cover opening/closing sensor 12A. The front cover opening/closing sensor 11A is for detecting opening and closing of the front cover 11. The rear cover opening/closing sensor 12A is for detecting opening and closing of the rear cover 12.

The front cover opening/closing sensor 11A is configured to be in contact with a part of the front cover 11 when the front cover 11 is closed, thereby outputting an ON signal to the controller 100. Further, the front cover opening/closing sensor 11A is configured to be separated from the front cover 11 when the front cover 11 is open, thereby outputting an OFF signal to the controller 100. Likewise, the rear cover opening/closing sensor 12A is configured to be in contact with a part of the rear cover 12 when the rear cover 12 is closed, thereby outputting an ON signal to the controller 100. Further, the rear cover opening/closing sensor 12A is configured to be separated from the rear cover 12 when the rear cover 12 is open, thereby outputting an OFF signal to the controller 100.

The controller 100 includes a CPU 101, a ROM 102, and a RAM 103, and is configured to perform various processes in response to receipt of commands (e.g., a print command), in accordance with pre-prepared programs 104. The programs 104 may be stored in the ROM 102. As shown in FIG. 3, the controller 100 is configured to execute a color mode for forming a multi-color image, a monochrome mode for forming a monochrome image, and an all-separation mode. The controller 100 controls a separation mechanism 200 for causing each individual developing roller 52 to be in contact with or separate from the corresponding photoconductive drum 61, thereby switching the mode to be executed from one mode to another among the above three modes.

Specifically, in the color mode, the controller 100 brings all the developing rollers 52Y, 52M, 52C, and 52K into contact with the corresponding photoconductive drums 61Y, 61M, 61C, and 61K, respectively, and rotates all the developing rollers 52 and all the photosensitive drums 61. Namely, when forming a multi-color image, the controller 100 operates all the cartridges 50 including the first cartridge 50K and the second cartridge 50Y.

In the monochrome mode, the controller 100 brings only the developing roller 52K for black into contact with the photoconductive drum 61K, and makes the developing rollers 52Y, 52M, and 52C for the other three colors separate from the corresponding photoconductive drums 61Y, 61M, and 61C. Further, in the monochrome mode, the controller 100 rotates only the developing roller 52K and stops the other developing rollers 52Y, 52M, and 52C, while rotating all the photoconductive drums 61. Namely, when forming a monochrome image, the controller 100 operates the first cartridge 50K without operating the cartridges 50Y, 50M, and 50C including the second cartridge 50Y.

Further, for instance, when cleaning the photoconductive drums 61, the controller 100 executes the all-separation mode to separate all the developing rollers 52Y, 52M, 52C, and 52K from the corresponding photoconductive drums 61Y, 61M, 61C, and 61K.

The controller 100 is configured to perform cooling control to cool the inside of the main body housing 10 based on temperatures for control. Here, the temperatures for control are temperatures estimated as temperatures of the cartridges 50. More specifically, in the illustrative embodiment, the temperatures for control are estimated as temperatures $T_B$ of the regulating blades 53. It is noted that hereinafter, the temperatures for control may be referred to as the "control temperatures."

The controller 100 is configured to calculate a first control temperature corresponding to the first cartridge 50K and a second control temperature corresponding to the second cartridge 50Y. The controller 100 performs the cooling control based on a higher one of the first and second control temperatures.

Specifically, the controller 100 calculates a differential temperature, which is a change in temperature of the regulating blade 53 from the time of previous calculation to the present time, at particular time intervals, based on the inside temperature, the outside temperature, and a driving state of the corresponding developing roller 52. Then, the controller 100 calculates the sum of the obtained differential temperature and the previously calculated temperature of the regulating blade 53 as a current temperature of the regulating blade 53.

Specifically, a current temperature $T_B(n)$ [° C.] of the regulating blade 53 is calculated using a previously calculated temperature $T_B(n-1)$ [° C.] and a differential temperature $\Delta T_B$ [° C.] of the regulating blade 53 in accordance with the following equation (1).

$$T_B(n)=T_B(n-1)+\Delta T_B \tag{1}$$

Here, the differential temperature $\Delta T_B$ [° C.] of the regulating blade 53 in the equation (1) is calculated, as shown in FIG. 4, using a heat quantity $\Delta E_{in\text{-}B}(n)$ [J] transferred from the air inside the main body housing 10 (more specifically, from around the first temperature sensor SE1) to the regulating blade 53, a heat quantity $\Delta E_{out\text{-}B}(n)$ [J] transferred from the regulating blade 53 to the outside air, and a heat generation amount $Q_B$ [W] of the regulating blade 53 (i.e., an amount of heat generated at the regulating blade 53), in accordance with the following equation (2):

$$\Delta T_B=(\Delta E_{in\text{-}B}(n)-\Delta E_{out\text{-}B}(n)+Q_B\times\Delta t)/C_B, \tag{2}$$

where $C_B$ [J/° C.] is a heat capacity of the regulating blade 53, and $\Delta t$ [sec] is a time from the time of previous calculation to the present time.

The heat quantity $\Delta Et_{in\text{-}B}(n)$ [J] transferred from the air (hereinafter referred to as the "inside air") inside the main body housing 10 to the regulating blade 53, in the equation (2), is calculated using a previously obtained inside temperature (i.e., a temperature inside the main body housing 10) $T_{in}(n-1)$ [° C.], the previously calculated temperature $T_B(n-1)$ [° C.] of the regulating blade 53, and a thermal resistance $R_{in\text{-}B}$ [° C./W] between the inside air and the regulating blade 53, in accordance with the following equation (3).

$$\Delta E_{in\text{-}B}(n)=(T_{in}(n-1)-T_B(n-1))\times\Delta t/R_{in\text{-}B} \tag{3}$$

The heat quantity $\Delta E_{out\text{-}B}(n)$ [J] transferred from the regulating blade 53 to the outside air, in the equation (2), is calculated using a previously obtained outside temperature $T_{out}(n-1)$ [° C.], the previously calculated temperature $T_B(n-1)$ [° C.] of the regulating blade 53, and a thermal resistance $R_{out\text{-}B}$ [° C./W] between the outside temperature and the regulating blade 53, in accordance with the following equation (4).

$$\Delta E_{out\text{-}B}(n)=(T_B(n-1)-T_{out}(n-1))\times\Delta t/R_{out\text{-}B} \tag{4}$$

$R_{in-B}$ in the equation (3) is set to different values between when the first control temperature is calculated and when the second control temperature is calculated. Likewise, $R_{out-B}$ in the equation (4) is set to different values between when the first control temperature is calculated and when the second control temperature is calculated. In other words, $R_{in-B}$ in a first function used to calculate the first control temperature is different from $R_{in-B}$ in a second function used to calculate the second control temperature. Further, $R_{out-B}$ in the first function used to calculate the first control temperature is different from $R_{out-B}$ in the second function used to calculate the second control temperature.

Specifically, a distance between the first temperature sensor SE1 and the first cartridge 50K is different from a distance between the first temperature sensor SE1 to the second cartridge 50Y. Therefore, a coefficient $1/R_{in-B}$ is set to different values between the first function and the second function. The coefficient $1/R_{in-B}$ is a coefficient to be multiplied, for instance, by the inside temperature as the temperature value previously obtained by the first temperature sensor SE1. Here, $1/R_{in-B}$ in the first function corresponds to a first coefficient. Further, $1/R_{in-B}$ in the second function corresponds to a second coefficient.

In addition, a distance between a particular location outside the main body housing 10 and the first cartridge 50K is different from a distance between the particular location outside the main body housing 10 and the second cartridge 50Y. Therefore, a coefficient $1/R_{out-B}$ is set to different values between the first function and the second function. The coefficient $1/R_{out-B}$ is a coefficient to be multiplied, for instance, by the outside temperature $T_{out}(n-1)$ as the temperature value previously obtained by the second temperature sensor SE2. Here, $1/R_{out-B}$ in the first function corresponds to a third coefficient. Further, $1/R_{out-B}$ in the second function corresponds to a fourth coefficient.

The heat generation amount $Q_B$ of the regulating blade 53 in the equation (2) is a parameter varying depending on an amount of operation of the cartridge 50. Namely, the heat generation amount $Q_B$ corresponds to the amount of operation of the cartridge 50. The heat generation amount $Q_B$ may be set, for instance, based on a drive time, a stop time, and a rotation speed of the developing roller 52.

From the equations (2) to (4), the controller 100 calculates the temperature $T_B$ of the regulating blade 53K, that is, the first control temperature, based on the inside temperature $T_{in}(n-1)$ (i.e., the temperature value previously obtained by the first temperature sensor SE1), the first coefficient $1/R_{in-B}$, the previous temperature $T_B(n-1)$ (i.e., the previous first control temperature) of the regulating blade 53K, the heat generation amount $Q_B$ (which corresponds to the amount of operation of the first cartridge 50K), the outside temperature $T_{out}(n-1)$ (i.e., the temperature value previously obtained by the second temperature sensor SE2), and the third coefficient $1/R_{out-B}$.

In addition, the controller 100 calculates the temperature $T_B$ of the regulating blade 53Y, that is, the second control temperature, based on the inside temperature $T_{in}(n-1)$ (i.e., the temperature value previously obtained by the first temperature sensor SE1), the second coefficient $1/R_{in-B}$, the previous temperature $T_B(n_{-1})$ (i.e., the previous second control temperature) of the regulating blade 53Y, the heat generation amount $Q_B$ (which corresponds to the amount of operation of the second cartridge 50Y), the outside temperature $T_{out}(n-1)$ (i.e., the temperature value previously obtained by the second temperature sensor SE2), and the fourth coefficient $1/R_{out-B}$.

The controller 100 obtains the aforementioned constants (e.g., $Q_B$, $C_B$, $R_{in-B}$, and $R_{out-B}$) from a memory, according to each of states regarding the color printer 1. The states regarding the color printer 1 may include, but are not limited to, the driving state of the corresponding developing roller 52, an open/closed state of the rear cover 12, a case where simplex/duplex printing is performed, a size of the sheet(s) P, an operating state of the fan 14, and an operating state of the fuser 80. Then, using the obtained constants, the controller 100 calculates the temperature of the corresponding regulating blade 53. Here, examples of the memory may include, but are not limited to, the ROM 102 and the RAM 103. For instance, the memory may store a map showing the aforementioned plurality of constants associated with each of a plurality of combinations of the aforementioned states regarding the color printer 1. For instance, for the closed state of the rear cover 12, the aforementioned constants are set to predetermined values, respectively. When the rear cover 12 is in the open state, $R_{in-B}$ and $R_{out-B}$ among the aforementioned constants are set to values different from the respective predetermined values.

In the illustrative embodiment, the driving state of the developing roller 52 is a state depending on whether a motor for driving the developing roller 52 is driven or stopped and a rotational speed of the developing roller 52. The states of the fuser 80 may include, but are not limited to, a state in which printing is in progress, a ready state in which a temperature of the fuser 80 is maintained at a lower level than when printing is performed, and a sleep state in which the fuser 80 is turned off.

In principle, the controller 100 determines the first control temperature and the second control temperature by calculation using the first function and the second function. However, in some exceptional circumstances, the controller 100 may set the first control temperature and the second control temperature without using any of the first and second functions.

Further, in principle, the controller 100 starts and terminates the cooling control based on the first control temperature and the second control temperature. However, in some exceptional circumstances, the controller 100 may terminate the cooling control without depending on any of the first and second control temperatures.

The controller 100 is configured to continue the cooling control when the drawer 60 is out of the image formation position during the cooling control.

Operations by the controller 100 will be described in detail below. The controller 100 repeatedly performs a process shown in FIG. 5.

In the process shown in FIG. 5, the controller 100 first performs a first temperature calculation process (S1). As shown in FIG. 6, in the first temperature calculation process, the controller 100 first obtains the inside temperature and the outside temperature from the first temperature sensor SE1 and the second temperature sensor SE2, respectively, and also obtains the constants (e.g., $Q_B$, $C_B$, $R_{in-B}$, and $R_{out-B}$) for each of the first and second functions from the memory (S101). Specifically, in S101, the controller 100 determines the states regarding the color printer 1 such as the driving state of each developing roller 52 in the first cartridge 50K and the second cartridge 50Y, and obtains, based on the determined states, the constants (e.g., $Q_B$, $C_B$, $R_{in-B}$, and $R_{out-B}$) to be used in each of the first and second functions.

After S101, the controller 100 calculates the temperature $T_B(n)$ of the regulating blade 53K, that is, the first control temperature based on the first function, and calculates the temperature $T_B(n)$ of the regulating blade 53Y, that is, the second control temperature based on the second function (S102). Specifically, in S102, the controller 100 calculates the first control temperature by substituting the temperature $T_B$ of the regulating blade 53K, the inside temperature $T_{in}$, and the outside temperature Tout, which are stored in the memory, into $T_B(n-1)$, $T_{in}(n-1)$, and $T_{out}(n-1)$ in the first function, respectively. Further, in S102, the controller 100 calculates the second control temperature by substituting the temperature $T_B$ of the regulating blade 53Y, the inside temperature $T_{in}$, and the outside temperature Tout, which are stored in the memory, into $T_B(n-1)$, $T_{in}(n-1)$, and $T_{out}(n-1)$ in the second function, respectively.

$T_B$, $T_{in}$, and $T_{out}$ in the first execution of S102 (i.e., when the calculation in S102 is made for the first time in the color printer 1) may be previously stored as initial values in the memory, or may be set based on the inside temperature and the outside temperature obtained this time, respectively.

After S102, the controller 100 updates $T_B$, $T_{in}$, and $T_{out}$ by overwriting $T_B$, $T_{in}$, and $T_{out}$ in the memory with the temperature $T_B(n)$ of each of the regulation blades 53K and 53Y calculated this time and the inside temperature $T_{in}(n)$ and the outside temperature $T_{out}(n)$ obtained this time (S103). Thereafter, the controller 100 terminates the first temperature calculation process. In the illustrative embodiment, $T_B$, $T_{in}$, and $T_{out}$ are overwritten as described above. However, a particular number of values, for each of the temperatures $T_B$, $T_{in}$, and $T_{out}$, may be stored in a time-series order.

Referring back to FIG. 5, after 51, the controller 100 performs a cooling control start/end determination process (S2). As shown in FIG. 7, in the cooling control start/end determination process, the controller 100 first obtains, from the memory, the temperature $T_B$ of the regulating blade 53K in the first cartridge 50K and the temperature $T_B$ of the regulating blade 53Y in the second cartridge 50Y (S201). After S201, the controller 100 selects a higher one of the temperature $T_B$ of the regulating blade 53K and the temperature $T_B$ of the regulating blade 53Y (S202).

After S202, the controller 100 determines whether or not the selected temperature $T_B$ is equal to or lower than a first threshold T1 (S203). When determining that the temperature $T_B$ is not equal to or lower than the first threshold T1 (i.e., the temperature $T_B$ is higher than the first threshold T1) (S203: No), the controller 100 determines whether or not the temperature $T_B$ is equal to or lower than a second threshold T2 which is higher than the first threshold T1 (S204).

Here, the second threshold T2 is a temperature equal to or lower than a melting point of the toner. The second threshold T2 may be the same value as the first threshold T1.

When determining in S204 that the temperature $T_B$ is not equal to or lower than the second threshold T2 (i.e., the temperature $T_B$ is higher than the second threshold T2) (S204: No), the controller 100 starts the cooling control (S206). Then, the controller 100 terminates the cooling control start/end determination process. If the controller 100 begins to execute S206 during the cooling control, the controller 100 continues the cooling control. When making an affirmative determination in S203 (i.e., S203: Yes) or S204 (i.e., S204: Yes), the controller 100 terminates the cooling control (S205). Thereafter, the controller 100 terminates the cooling control start/end determination process.

The controller 100 performs the following process based on the temperature $T_B$ during the cooling control. During the cooling control, when the temperature $T_B$ is equal to or lower than a third threshold T3 that is higher than the second threshold T2, the controller 100 sets an air volume of air from the fan 14 larger than when the cooling control is not performed. Specifically, in the cooling control, the controller 100 rotates the fan 14 at a higher rotational speed than a rotational speed before the cooling control is started.

Further, during the cooling control, when the temperature $T_B$ is higher than the third threshold T3 and is equal to or lower than a fourth threshold T4 that is higher than the third threshold T3, the controller 100 sets the number of pages to be printed per unit time in printing control to be less than when the cooling control is not performed. Applicable methods for reducing the number of pages to be printed may include, but are not limited to, a method of setting the rotational speed of each photoconductive drum 61 and the rotational speed of each developing roller 52 lower than when normal printing is performed, thereby setting a conveyance speed for the sheet P lower than when the normal printing is performed, and a method of setting a conveyance interval between the sheets P wider than when the normal printing is performed. In the normal printing, the controller 100 performs such printing control as to maximize the number of pages printed per unit time, that is, printing control before the cooling control is started.

In the method of reducing the conveyance speed for the sheet P, the rotational speed of each developing roller 52 is reduced. Herewith, it is possible to suppress generation of heat due to friction between the developing rollers 52 and the regulating blades 53, thereby cooling the cartridges 50. In this case, as an example, the conveyance speed for the sheet P may be set to half of a conveyance speed applied when the cooling control is not performed. In the method of increasing the conveyance interval between the sheets P, a frequency with which the sheet P, which takes heat from the heating roller 81, is fed to the fuser 80 is reduced. Herewith, it is possible to suppress an amount of heat generated by the fuser 80 and suppress an increase in the inside temperature $T_{in}$, thereby cooling the cartridges 50.

When the temperature $T_B$ is higher than the fourth threshold T4 during the cooling control, the controller 100 stops printing. Herewith, it is possible to suppress generation of heat due to the friction between the developing rollers 52 and the regulating blades 53 and suppress the amount of heat generated by the fuser 80, thereby cooling the cartridges 50.

Referring back to FIG. 5, after S2, the controller 100 determines whether there is a print job to be executed (S3). When determining that there is a print job to be executed (S3: Yes), the controller 100 performs a printing process based on the print job (S4). After S4, or when determining that there is not a print job to be executed (S3: No), the controller 100 determines whether the front cover 11 is open, based on the signal from the front cover opening/closing sensor 11A (S5).

When determining in S5 that the front cover 11 is not open (S5: No), the controller 100 goes back to S1. Meanwhile, when determining that the front cover 11 is open (S5: Yes), the controller 100 performs a when-cover-is-open process (S6). Thereafter, the controller 100 goes back to S1.

As shown in FIGS. 8A and 8B, in the when-cover-is-open process, the controller 100 first determines whether there is a response from the first temperature sensor SE1 disposed in the drawer 60, that is, whether the first contact CN1 is disconnected from the second contact CN2, thereby determining whether the drawer 60 has been withdrawn out of the image formation position in the main body housing 10 (S601). When determining that the drawer 60 has been withdrawn out of the image formation position in the main body housing 10 (S601: Yes), the controller 100 determines whether or not an elapsed time TM since the drawer 60 was withdrawn out of the image formation position is equal to or longer than a particular time Tth (S602).

When determining that the elapsed time TM since the drawer 60 was withdrawn out of the image formation position is not equal to or longer than the particular time Tth (S602: No), the controller 100 performs a second temperature calculation process (S603). As shown in FIG. 9, the second temperature calculation process includes S111 and S113 which are partially different from S101 and S103 in the aforementioned first temperature calculation process (see FIG. 6), respectively, and further includes S102 which is substantially the same as S102 in the first temperature calculation process.

In S111, the controller 100 obtains the outside temperature from the second temperature sensor SE2 and obtains the constants (e.g., $Q_B$, $C_B$, $R_{in\text{-}B}$, and $R_{out\text{-}B}$) used for each of the first and second functions from the memory, but does not obtain the inside temperature from the first temperature sensor SE1. After S111, the controller 100 executes S102, and then goes to S113.

In S113, the controller 100 overwrites $T_B$ and $T_{out}$ in the memory with the temperature $T_B(n)$ of each of the regulating blades 53K and 53Y calculated this time and the outside temperature $T_{out}(n)$ obtained this time, thereby updating $T_B$ and $T_{out}$. However, the controller 100 does not update the inside temperature Tin in the memory. Thus, the inside temperature $T_{in}$ in the memory is maintained at the detected value of the first temperature sensor SE1 that has been obtained by the controller 100 immediately before the drawer 60 is withdrawn out of the image formation position. Therefore, when determining in S601 that the drawer 60 has been withdrawn out of the image formation position in the main body housing 10 (S601: Yes), the controller 100 calculates in S102 the temperature $T_B(n)$ of each of the regulating blades 53K and 53Y, based on the detected value of the first temperature sensor SE1 that has been obtained immediately before the drawer 60 is withdrawn out of the image formation position, and the previous temperature $T_B$ of each of the regulating blades 53K and 53Y.

Referring back to FIGS. 8A and 8B, when determining that the elapsed time TM since the drawer 60 was withdrawn out of the image formation position is equal to or longer than the particular time Tth (S602: Yes), the controller 100 stops the cooling control regardless of the temperatures $T_B$ of the regulating blades 53K and 53Y (S604). Namely, the controller 100 stops the cooling control when the elapsed time TM since the drawer 60 was withdrawn out of the image formation position is equal to or longer than the particular time Tth, in a state where the drawer 60 remains withdrawn out of the image formation position.

After S603 or S604, the controller 100 determines whether there is a response from the first temperature sensor SE1, that is, whether the first contact CN1 is connected with the second contact CN2, thereby determining whether the drawer 60 has been placed in the image formation position in the main body housing 10 (S605). When determining that the drawer 60 has not been placed in the image formation position in the main body housing 10 (S605: No), the controller 100 goes back to S602.

When determining that the drawer 60 has been placed in the image formation position in the main body housing 10 (S605: Yes), the controller 100 determines whether at least one of the first cartridge 50K and the second cartridge 50Y, which are the targets for the temperature calculation, has been replaced with a new one (S606). Here, the determination in S606 as to whether at least one of the first cartridge 50K and the second cartridge 50Y has been replaced with a new one may be made, for instance, based on information stored in an IC chip attached to each of the cartridges 50K and 50Y, or by detecting a position of a protrusion provided at each of the cartridges 50K and 50Y and configured to move from a new-cartridge position to an old-cartridge position.

When determining that at least one of the first cartridge 50K and the second cartridge 50Y has been replaced with a new one (S606: Yes), the controller 100 rewrites the temperature $T_B$ in the memory that corresponds to the new cartridge 50, with the outside temperature $T_{out}(n)$ obtained this time (S607). Namely, when the drawer 60 is moved to the image formation position (S605: Yes), and it is determined that at least one of the first cartridge 50K and the second cartridge 50Y has been replaced with a new one (S606: Yes), regardless of the elapsed time TM, the controller 100 sets (updates) at least one, corresponding to the new cartridge 50, of the temperatures $T_B$ in the memory as the corresponding control temperature(s), based on the value obtained by the second temperature sensor SE2. In other words, in this case, the controller 100 does not use at least one, corresponding to the new cartridge 50, of the temperatures $T_B$ stored in the memory as the previous first control temperature and the previous second control temperature. When determining that none of the first cartridge 50K and the second cartridge 50Y has been replaced with a new one (S606: No), the controller 100 determines whether or not the elapsed time TM since the drawer 60 was withdrawn out of the image formation position is equal to or longer than the particular time Tth (S608).

When determining that the elapsed time TM since the drawer 60 was withdrawn out of the image formation position is not equal to or longer than the particular time Tth (S608: No), the controller 100 performs the first temperature calculation process shown in FIG. 6 (S609). Namely, when the drawer 60 is moved to the image formation position (S605: Yes) after the drawer 60 is withdrawn out of the image formation position (S601: Yes), if the elapsed time TM since the drawer 60 was withdrawn out of the image formation position is shorter than the particular time Tth (S608: No), the controller 100 calculates the respective temperatures $T_B(n)$ of the regulating blades 53K and 53Y, based on the previous temperature values stored in the memory, such as the previous value (Tin) obtained by the first temperature sensor SE1 and the previous temperatures $T_B$ of the regulating blades 53K and 53Y.

In the first temperature calculation process (see FIG. 6) immediately after it is determined in S605 that the drawer 60 has been placed in the image formation position, the inside temperature $T_{in}$ in the memory, which is maintained at the value obtained by the first temperature sensor SE1 immediately before the drawer 60 is withdrawn out of the image formation position, is used as the previous inside temperature $T_{in}(n-1)$. However, in S103, the inside temperature Tin in the memory is overwritten with the inside temperature $T_{in}(n)$ obtained this time in S101 of the first temperature calculation process in this control cycle, and is updated. Therefore, in the first temperature calculation process in the subsequent control cycles, the inside temperature $T_{in}$ obtained by the first temperature sensor SE1 during a previous control cycle is used as the previous inside temperature $T_{in}(n-1)$.

When determining that the elapsed time TM since the drawer 60 was withdrawn out of the image formation position is equal to or longer than the particular time Tth (S608: Yes), the controller 100 obtains the inside temperature $T_{in}$ from the first temperature sensor SE1, and overwrites the temperature $T_B$ corresponding to each of the cartridges 50K and 50Y in the memory with the inside temperature $T_{in}(n)$ obtained this time, thereby updating each temperature $T_B$ in the memory (S610). Namely, when the drawer 60 is moved to the image formation position (S605: Yes) after the drawer 60 is withdrawn out of the image formation position (S601: Yes), if the elapsed time TM is equal to or longer than the particular time Tth (S608: Yes), the controller 100 sets (updates) the temperatures $T_B$ in the memory as the control temperatures based on the value obtained by the first temperature sensor SE1 (S610), without using the temperatures $T_B$ (i.e., the temperatures $T_B$ before updating in S610) stored in the memory as the previous control temperatures.

After S609 or S610, the controller 100 determines whether stop conditions for stopping the cooling control are satisfied (S611). Here, the stop conditions for the cooling control include a condition defined by a process of S201 to S203 in the cooling control start/end determination process shown in FIG. 7. Namely, in S611, the controller 100 determines whether the higher one of the temperatures $T_B$ corresponding to the cartridges 50K and 50Y that are stored in the memory is equal to or lower than the first threshold T1.

When determining that the stop conditions for the cooling control are satisfied (S611: Yes), the controller 100 stops the cooling control (S612). If the cooling control has already been stopped in S604, which is a process prior to S612, the controller 100 does nothing in S612.

Namely, when the drawer 60 is moved to the image formation position (S605: Yes) after the elapsed time TM is equal to or longer than the particular time Tth, the controller 100 does nothing in S612 since the controller 100 has already stopped the cooling control in S604. On the other hand, when the drawer 60 is moved to the image formation position (S605: Yes) when the elapsed time TM is shorter than the particular time Tth, since the controller 100 has not executed S604, the controller 100 stops the cooling control based on the respective temperatures $T_B$ (i.e., the first and second control temperatures) corresponding to the cartridges 50K and 50Y.

After S612 or when making a negative determination in S611 (S611: No), the controller 100 determines whether the front cover 11 has been closed, based on the signal from the front cover opening/closing sensor 11A (S613). When determining that the front cover 11 has been closed (S613: Yes), the controller 100 terminates the when-cover-is-open process shown in FIGS. 8A and 8B. When determining that the front cover 11 has not been closed (S613: No), the controller 100 goes back to S601.

When determining that the drawer 60 has not been withdrawn out of the image formation position in the main body housing 10 (S601: Yes), the controller 100 performs the first temperature calculation process shown in FIG. 6 (S614). After S614, the controller 100 proceeds to S611.

The following describes operations and advantageous effects of the color printer 1 configured as above. When the developing rollers 52 rotate during a printing operation or in a warming operation performed before the printing operation, the temperature of each regulating blade 53 rises due to the friction between each regulating blade 53 and the corresponding developing roller 52. In addition, when the fuser 80 is in an ON state, the heat from the fuser 80 warms the regulating blades 53.

In the color printer 1, the controller 100 calculates the temperatures of the regulating blades 53 based on the inside temperature detected by the first temperature sensor SE1, the outside temperature detected by the second temperature sensor SE2, and the driving states of the developing rollers 52. Then, when the temperature of at least one of the regulating blades 53 becomes higher than the second threshold T2, the controller 100 performs the cooling control. Thus, the cooling control is appropriately performed to suppress deterioration of the toner.

The controller 100 changes the constants used to calculate the temperatures of the regulating blades 53 according to the driving states of the developing rollers 52. Thus, in calculating the temperatures of the regulating blades 53, the controller 100 is enabled to take into account the difference in temperature changes of the cartridges 50 due to the difference in the driving states of the developing rollers 52. Thereby, the cooling control is appropriately performed.

There is a difference in the temperature changes of the cartridges 50 between when only cold sheets P are fed to the image forming engine 30 (e.g., when simplex printing is performed) and when sheets P heated through the fuser 80 are fed to the image forming engine 30 through the fusing unit 80 (e.g., when duplex printing is performed). The controller 100 changes the constants used to calculate the temperatures of the regulating blades 53 depending on which, of simplex printing and duplex printing, is performed. Thus, in calculating the temperatures of the regulating blades 53, the controller 100 is enabled to take into account the difference in temperature changes of the cartridges 50 between when simplex printing is performed and when duplex printing is performed.

When printing is performed on a small-size sheet P, which has a small thermal capacity, an amount of heat transferred from the cartridges 50 to the sheet P is smaller, and the temperatures of the cartridges 50 tend to rise more easily, than when printing is performed on a sheet P that is larger in size than the small-size sheet P. In the illustrative embodiment, the controller 100 changes the constants used to calculate the temperatures of the regulating blades 53 between when printing is performed on the small-size sheet P and when printing is performed on the sheet P with a larger size. Thus, in calculating the temperatures of the regulating blades 53, the controller 100 is enabled to take into account the difference in temperature changes of the cartridges 50 due to the difference in size of the sheet P.

The controller 100 changes the constants used to calculate the temperatures of the regulating blades 53 according to the operating state of the fan 14. Thus, in calculating the temperatures of the regulating blades 53, the controller 100 is enabled to take into account the difference in temperature changes of the cartridges 50 due to the difference in cooling effects for cooling the inside of the main body housing 10 by the fan 14.

The controller 100 changes the constants used to calculate the temperatures of the regulating blades 53 according to the operating state of the fuser 80. Thus, in calculating the temperatures of the regulating blades 53, the controller 100 is enabled to take into account the difference in temperature changes of the cartridges 50 due to the operating state of the fuser 80.

In the illustrative embodiment, none of the cartridges 50 has a temperature sensor. Therefore, it is possible to reduce a cost of each cartridge 50.

The first temperature sensor SE1 is positioned between the fuser 80 and the cartridges 50 in the pull-out direction D for the drawer 60 inside the main body housing 10. Thus, it is possible to measure the heat transferring from the fuser 80 toward the cartridges 50 by the first temperature sensor SE1.

The second temperature sensor SE2 is disposed to face the intake port 15. Thus, it is possible to properly measure the temperature of the outside air introduced into the main body housing 10 via the intake port 15 by the second temperature sensor SE2.

When the drawer 60 is again placed in the image formation position, and the elapsed time TM since the drawer 60 was withdrawn is shorter than the particular time Tth, the value obtained by the first temperature sensor SE1 is likely to be not so different from that before the drawer 60 was withdrawn. Therefore, in this case, proper control temperatures are obtained by calculating the control temperatures based on the value obtained by the first temperature sensor SE1 and the previous control temperatures. Meanwhile, when the drawer 60 is again placed in the image formation position, and the elapsed time TM since the drawer 60 was withdrawn is equal to or longer than the particular time Tth, the value obtained by the first temperature sensor SE1 is likely to be significantly different from that before the drawer 60 was withdrawn. Therefore, in this case, proper control temperatures are obtained by setting the control temperatures based on the value obtained by the first temperature sensor SE1 without using the previous control temperatures.

When the drawer 60 is withdrawn out of the image formation position, the control temperatures are calculated based on the value obtained by the first temperature sensor SE1 immediately before the drawer 60 is withdrawn out of the image formation position and the previous control temperatures. Therefore, it is possible to more accurately calculate the control temperatures in the first temperature calculation process after the drawer 60 is again placed in the image formation position.

The first contact CN1 and the second contact CN2, which are connected with each other when the drawer 60 is placed in the image formation position and are disconnected from each other when the drawer 60 is out of the image formation position, are disposed at the drawer 60 and the main body housing 10, respectively. Therefore, it is possible to determine that the drawer 60 is out of the image formation position when the controller 100 is unable to obtain a response from the first temperature sensor SE1.

The controller 100 increases the air volume of air from the fan 14 in the cooling control. Therefore, it is possible to cool the inside of the main body housing 10 by the airflow from the fan 14.

The controller 100 decreases the number of pages printed per unit time in the cooling control, thereby, for instance, reducing the amount of operation of each cartridge 50 and reducing the amount of the heat generated by the fuser 80. Therefore, it is possible to cool the cartridges 50 in a favorable manner.

A new cartridge 50 has a temperature close to the outside temperature. Hence, by setting the control temperatures based on the value (i.e., the outside temperature) obtained by the second temperature sensor SE2, it is possible to properly calculate the control temperatures.

The first temperature sensor SE1 is disposed upstream of the cartridges 50 in the pull-out direction D for the drawer 60. Hence, when the drawer 60 is placed in the image formation position inside the main body housing 10, the first temperature sensor SE1 is placed around a center of the main body housing 10 where the temperature tends to be high. Accordingly, the controller 100 is allowed to properly calculate the control temperatures based on the temperature of a portion, at which the temperature tends to be high, inside the main body housing 10, thereby performing appropriate cooling control.

Even in a situation where the drawer 60 is out of the image formation position, and the controller 100 is unable to obtain the value detected by the first temperature sensor SE1, the controller 100 stops the cooling control when the elapsed time TM is equal to or longer than the particular time Tth. Therefore, the cooling control is prevented from being continued unnecessarily. When the elapsed time TM is equal to or longer than the particular time Tth, it is highly likely that the cartridges 50 have been exposed to the outside air for a long time and have been sufficiently cooled. Thus, in this case, there is no problem even if the controller 100 stops the cooling control.

If the drawer 60 is placed in the image formation position when the elapsed time TM is shorter than the particular time Tth, the controller 100 stops the cooling control based on the control temperatures (more specifically, based on a higher one of the temperatures $T_B$). Therefore, it is possible to stop the cooling control based on the proper control temperatures.

The controller 100 performs the cooling control based on the control temperature corresponding to a cartridge 50, which has a higher temperature, of the cartridges 50K and 50Y that are under respective different installation conditions. Therefore, the first cartridge 50K and the second cartridge 50Y are cooled favorably.

Since the first control temperature is calculated based on the first function, it is possible to accurately calculate the first control temperature. Since the second control temperature is calculated based on the second function, it is possible to accurately calculate the second control temperature.

In the monochrome mode, the first cartridge 50K, which is operated in this mode, is set as a target of which the temperature (more specifically, the temperature $T_B$ of the regulating blade 53K) is calculated as the first control temperature. Further, in the monochrome mode, the second cartridge 50Y, which is not operated in this mode, is set as a target of which the temperature (more specifically, the temperature $T_B$ of the regulating blade 53Y) is calculated as the second control temperature. Therefore, even when the amount of operation of each cartridge 50 varies depending on a type of the image to be formed, it is possible to accurately calculate the first control temperature and the second control temperature.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications may be feasible.

(Modifications)

In the aforementioned illustrative embodiment, when the drawer 60 is again placed in the image formation position, and the elapsed time TM is equal to or longer than the particular time Tth, the value obtained by the first temperature sensor SE1 is set as the control temperatures (i.e., the temperatures $T_B$ corresponding to the cartridges 50K and 50Y). However, for instance, each control temperature may be set based on the value obtained by the first temperature sensor SE1, more specifically, set to the value obtained by the first temperature sensor SE1 multiplied by a particular coefficient.

In the aforementioned illustrative embodiment, the controller 100 determines whether the drawer 60 is placed in the image formation position, based on whether the first contact CN1 and the second contact CN2 are connected with or disconnected from each other. However, for instance, the controller 100 may determine whether the drawer 60 is placed in the image formation position, using a sensor configured to detect the position of the drawer 60.

In the aforementioned illustrative embodiment, when determining that at least one of the first cartridge 50K and the second cartridge 50Y has been replaced with a new one, the controller 100 sets the value obtained by the second temperature sensor SE2 as the control temperature (i.e., the temperature $T_B$) corresponding to the new cartridge 50. However, for instance, the control temperature corresponding to the new cartridge 50 may be set based on the value obtained by the second temperature sensor SE2, more specifically, set to the value obtained by the second temperature sensor SE2 multiplied by a particular coefficient.

In the aforementioned illustrative embodiment, an example is shown in which each of the cartridges 50 does not include a photoconductive drum 61. However, each of the cartridges 50 may include a photoconductive drum 61.

In the aforementioned illustrative embodiment, the photoconductive drum 61 corresponding to each cartridge 50 is shown as an example of a photoconductive body. However, a belt-shaped photoconductive body, as well as the photoconductive drum 61, may be included in examples of the photoconductive body.

In the aforementioned illustrative embodiment, the controller 100 performs, as the cooling control, controlling the fan 14, reducing the number of pages to be printed per unit time, and stopping printing in stages according to a higher one of the temperatures $T_B$. However, for instance, the cooling control may include only controlling the fan 14 or only reducing the number of pages to be printed per unit time.

In the aforementioned illustrative embodiment, in principle, the control temperatures are determined by calculation using the first function and the second function. However, for instance, the value obtained by the first temperature sensor may be set as a control temperature.

In the aforementioned illustrative embodiment, the toner of yellow is illustrated as an example of colored developer. However, examples of the colored developer may include toner of a color such as magenta other than yellow.

In the aforementioned illustrative embodiment, the two cartridges 50K and 50Y among the four cartridges 50 are set as targets for temperature calculation. However, three or more cartridges 50 may be set as targets for temperature calculation, or a single cartridge 50 may be set as a target for temperature calculation.

In the aforementioned illustrative embodiment, in S602 and S608, the elapsed time TM is compared with the same threshold, that is, the particular time Tth. However, for instance, in S602, the controller 100 may determines whether or not the elapsed time TM is equal to or longer than a first particular time Tth1. In this case, in S608, the controller 100 may determines whether or not the elapsed time TM is equal to or longer than a second particular time Tth2 that is different from the first particular time Tth1.

In the aforementioned illustrative embodiment, an example is shown in which the drawer 60 includes the first temperature sensor SE1. However, the main body housing 10 may include the first temperature sensor SE1. In this case, as shown in FIG. 10, the first temperature sensor SE1 may be positioned between the drawer 60 and the fuser 80 in the pull-out direction D for the drawer 60. In other words, the first temperature sensor SE1 may be positioned between the cartridge 50K, which is closest to the fuser 80, and the fuser 80 in the pull-out direction D for the drawer 60. Thus, in the case where the main body housing 10 includes the first temperature sensor SE1, the controller 100 is allowed to obtain the inside temperature by the first temperature sensor SE1 even when the drawer 60 is withdrawn from the main body housing 10.

In the aforementioned illustrative embodiment, the drawer 60 includes the first temperature sensor SE1. However, a cartridge 50 may include the first temperature sensor SE1. For instance, as shown in FIG. 11, the cartridge 50K may include the first temperature sensor SE1. In this case, when the drawer 60 is pulled out from the main body housing 10, the cartridge 50K may be removed from the main body housing 10. Further, when the drawer 60 is placed into the image formation position, the cartridge 50K may be attached to the main body housing 10.

When an elapsed time since the cartridge 50K was removed from the main body housing 10 is shorter than a predetermined time, the controller 100 may calculate the control temperatures based on the value obtained by the first temperature sensor SE1 and the previous control temperatures. Meanwhile, when the elapsed time since the cartridge 50K was removed from the main body housing 10 is equal to or longer than the predetermined time, the controller 100 may calculate the control temperatures based on the value obtained by the first temperature sensor SE1.

The controller 100 may continue the cooling control when the cartridge 50K is removed from the main body housing 10 during the cooling control. In addition, the controller 100 may stop the cooling control when the elapsed time since the cartridge 50K was removed from the main body housing 10 is equal to or longer than the predetermined time, in a state where the cartridge 50K remains removed from the main body housing 10.

In the modification shown in FIG. 10, the temperature sensor SE1 is disposed at the cartridge (e.g., 50K) detachably attached to the drawer 60. However, for instance, a temperature sensor may be disposed at a cartridge detachably attached to a main body housing of a monochrome printer. In this case, the monochrome printer may perform control processes according to aspects of the present disclosure.

In the aforementioned illustrative embodiment, aspects of the present disclosure have been applied to the color printer 1. However, aspects of the present disclosure may be applied to other image forming apparatuses such as copy machines and multi-function peripherals.

In the aforementioned illustrative embodiment, the controller 100 is configured to change the constants used to calculate the control temperatures between when simplex printing is performed and when duplex printing is performed. However, for instance, the controller 100 may be configured to change the constants used to calculate the control temperatures between when printing is performed of a first surface of the sheet P and when printing is performed on a second surface of the sheet P.

The configuration of the fuser 80 is not limited to that shown in the aforementioned illustrative embodiment. For instance, the fuser 80 may include a fixing belt, a nip plate, and a pressure member configured to sandwich the sheet P between the nip plate and the pressure member.

Aspects of the present disclosure may be practiced by arbitrarily combining elements described in the aforementioned illustrative embodiment and modifications.

The following shows examples of associations between elements exemplified in the aforementioned illustrative embodiments and modifications and elements according to aspects of the present disclosure. The color printer 1 may be an example of an "image forming apparatus" according to aspects of the present disclosure. The main body housing 10 may be an example of a "main body housing" according to aspects of the present disclosure. The cartridge 50K may be an example of a "first cartridge" according to aspects of the present disclosure. The cartridge 50Y may be an example of a "second cartridge" according to aspects of the present disclosure. The first temperature sensor SE1 may be an example of a "first temperature sensor" according to aspects of the present disclosure. The second temperature sensor SE2 may be an example of a "second temperature sensor" according to aspects of the present disclosure. The controller 100 may be an example of a "controller" according to aspects of the present disclosure. The fan 14 may be an example of a "fan" according to aspects of the present disclosure. The fuser 80 may be an example of a "fuser" according to aspects of the present disclosure.

What is claimed is:

1. An image forming apparatus comprising:

a main body housing;

a holder configured to hold a cartridge storing developer and to be removably attached to an image formation position in the main body housing;

a first temperature sensor disposed at the holder; and a controller configured to:

perform cooling control to cool an inside of the main body housing, based on a control temperature based on a temperature detected by the first temperature sensor;

in a case where the holder is removed out of the image forming position, and the holder is reattached to the image forming position before a particular time elapses thereafter, calculate the control temperature based on the temperature detected by the first temperature sensor and a previous control temperature; and in a case where the holder is removed out of the image forming position, and the holder is reattached to the image forming position when or after the particular time has elapsed thereafter, calculate the control temperature based on the temperature detected by the temperature sensor without using the previous control temperature.

2. The image forming apparatus according to claim 1, wherein the controller is further configured to, in a state where the holder is removed out of the image formation position, calculate the control temperature based on the temperature detected by the first temperature sensor before the holder is removed out of the image formation position, and the previous control temperature.

3. The image forming apparatus according to claim 1, wherein the controller is further configured to calculate the control temperature based on the temperature detected by the first temperature sensor, the previous control temperature, and an amount of operation of the cartridge.

4. The image forming apparatus according to claim 1, further comprising a second temperature sensor configured to detect an outside temperature as a temperature of air outside the main body housing, wherein the controller is further configured to calculate the control temperature based on the temperature detected by the first temperature sensor, the previous control temperature, an amount of operation of the cartridge, and the outside temperature detected by the second temperature sensor.

5. The image forming apparatus according to claim 4, wherein the controller is further configured to, when the holder is attached to the image formation position, and it is determined that the cartridge is replaced with a new cartridge, regardless of the elapsed time, calculate the control temperature based on the outside temperature detected by the second temperature sensor, without using the previous control temperature.

6. The image forming apparatus according to claim 1, wherein the holder includes a first contact conductive to the first temperature sensor, wherein the main body housing includes a second contact conductive to the controller, wherein when the holder is removed out of the image formation position, the first contact is disconnected from the second contact, and wherein when the holder is attached to the image formation position, the first contact is connected with the second contact.

7. The image forming apparatus according to claim 1, further comprising a fan configured to cool the inside of the main body housing, wherein the controller is further configured to set an air volume of air from the fan larger than when the cooling control is not performed.

8. The image forming apparatus according to claim 1, wherein the controller is further configured to set a count of pages to be printed per unit time less than when the cooling control is not performed.

9. The image forming apparatus according to claim 1, wherein the holder is configured to be withdrawn out of the main body housing from the image formation position, and wherein the first temperature sensor is disposed upstream of the cartridge in a pull-out direction in which the holder is withdrawn.

10. The image forming apparatus according to claim 1, further comprising a fuser configured to fix a developer image onto a sheet, wherein the first temperature sensor is disposed between the cartridge and the fuser.

11. An image forming apparatus comprising:

a main body housing;

a holder configured to hold a cartridge storing developer and to be removably attached to an image formation position in the main body housing;

a temperature sensor disposed at the holder; and a controller configured to:

start and stop cooling control to cool an inside of the main body housing based on a control temperature based on a temperature detected by the temperature sensor;

when the holder is removed out of the image formation position during the cooling control, continue the cooling control;

stop the cooling control when an elapsed time since the holder was removed out of the image formation position is equal to or longer than a particular time, in a state where the holder remains removed out of the image formation position.

12. The image forming apparatus according to claim 11, wherein the controller is further configured to, in a case where the holder is attached to the image formation position, when the elapsed time is shorter than the particular time, stop the cooling control based on the control temperature.

13. The image forming apparatus according to claim 11, further comprising a fan configured to cool the inside of the main body housing, wherein the controller is further configured to set an air volume of air from the fan larger than when the cooling control is not performed.

14. The image forming apparatus according to claim 11, wherein the controller is further configured to calculate the control temperature based on the temperature detected by the temperature sensor and an amount of operation of the cartridge.

15. The image forming apparatus according to claim 11, wherein the holder includes a first contact conductive to the temperature sensor, wherein the main body housing includes a second contact conductive to the controller, wherein when the holder is removed out of the image formation position, the first contact is disconnected from the second contact, and wherein when the holder is attached to the image formation position, the first contact is connected with the second contact.

16. The image forming apparatus according to claim 11, wherein the holder is configured to be withdrawn out of the main body housing from the image formation position, and wherein the temperature sensor is disposed upstream of the cartridge in a pull-out direction in which the holder is withdrawn.

17. The image forming apparatus according to claim 11, further comprising a fuser configured to fix a developer image onto a sheet, wherein the temperature sensor is disposed between the cartridge and the fuser.

18. An image forming apparatus comprising:

a main body housing;

a cartridge configured to store developer and to be removably attached to an image formation position in the main body housing;

a temperature sensor disposed at the cartridge; and a controller configured to:

start and stop cooling control to cool an inside of the main body housing based on a control temperature based on a temperature detected by the temperature sensor;

when the cartridge is removed out of the image formation position during the cooling control, continue the cooling control;

stop the cooling control when an elapsed time since the cartridge was removed out of the image formation position is equal to or longer than a particular time, in a state where the cartridge remains removed out of the image formation position.

19. The image forming apparatus according to claim 18, further comprising a fan configured to cool the inside of the main body housing, wherein the controller is further configured to set an air volume of air from the fan larger than when the cooling control is not performed.

20. The image forming apparatus according to claim 18, wherein the controller is further configured to calculate the control temperature based on the temperature detected by the temperature sensor and an amount of operation of the cartridge.

* * * * *